US009812683B2

(12) United States Patent
Aiba et al.

(10) Patent No.: US 9,812,683 B2
(45) Date of Patent: Nov. 7, 2017

(54) BATTERY BLOCK AND SECONDARY BATTERY MODULE

(71) Applicant: Hitachi Automotive Systems, Ltd., Hitachinaka-shi, Ibaraki (JP)

(72) Inventors: Tsunemi Aiba, Hitachinaka (JP); Hiroshi Iwata, Hitachinaka (JP); Hiroshi Hoshi, Hitachinaka (JP); Chikara Kikkawa, Hitachinaka (JP); Nayuta Yamachi, Hitachinaka (JP); Takashi Kobune, Hitachinaka (JP); Takeshi Haga, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 201 days.

(21) Appl. No.: 14/758,024

(22) PCT Filed: Feb. 18, 2013

(86) PCT No.: PCT/JP2013/053848
§ 371 (c)(1),
(2) Date: Jun. 26, 2015

(87) PCT Pub. No.: WO2014/125642
PCT Pub. Date: Aug. 21, 2014

(65) Prior Publication Data
US 2015/0349390 A1 Dec. 3, 2015

(51) Int. Cl.
*H01M 10/48* (2006.01)
*H01M 2/10* (2006.01)
*H01M 2/20* (2006.01)

(52) U.S. Cl.
CPC ......... *H01M 2/1077* (2013.01); *H01M 2/206* (2013.01); *H01M 10/482* (2013.01)

(58) Field of Classification Search
CPC ... H01M 10/482; H01M 2/1077; H01M 2/206
See application file for complete search history.

(56) References Cited

U.S. PATENT DOCUMENTS

| | | | |
|---|---|---|---|
| 2010/0248008 A1* | 9/2010 | Sugawara | H01M 2/1077 429/159 |
| 2011/0244283 A1 | 10/2011 | Seto et al. | |
| 2012/0231638 A1 | 9/2012 | Ikeda et al. | |

FOREIGN PATENT DOCUMENTS

| | | |
|---|---|---|
| EP | 1 054 461 A2 | 11/2000 |
| EP | 2 495 787 A1 | 9/2012 |

(Continued)

OTHER PUBLICATIONS

International Search Report (PCT/ISA/210) dated Mar. 26, 2013 with English-language translation (four (4) pages).

(Continued)

*Primary Examiner* — Carlos Barcena
(74) *Attorney, Agent, or Firm* — Crowell & Moring LLP

(57) ABSTRACT

The purpose of the present invention is to provide a battery block capable of reducing stress acting on a connection portion due to thermal expansion/contraction or size error. A battery block (40) according to the present invention includes: a plurality of conductive members (191) arranged along side surfaces (114) of a holding case (111) and electrically connecting corresponding battery cells (101); voltage detection boards (201, 202) disposed opposite the side surfaces (114) of the holding case (111) and detecting the voltage of the battery cells (101); and a plurality of voltage detection terminals (204) respectively electrically connected to a plurality of conductive members (192) disposed on the voltage detection boards (201, 202). In the voltage detection terminals (204), a securing portion (221) secured to the voltage detection boards (201, 202) and a connection portion (231) connected to the conductive mem- (Continued)

bers (192) are disposed along an arranged direction, with a bend portion (241) which is elastically deformable in at least the arranged direction disposed between the securing portion (221) and the connection portion (231).

7 Claims, 17 Drawing Sheets

(56) References Cited

FOREIGN PATENT DOCUMENTS

| EP | 2 650 946 A1   | 10/2013 |
|----|----------------|---------|
| JP | 2006-134801 A  | 5/2006  |
| JP | 2008-288077 A  | 11/2008 |
| JP | 2011-228216 A  | 11/2011 |
| JP | 2012-221844 A  | 11/2012 |
| JP | 2012/243514 A  | 12/2012 |

OTHER PUBLICATIONS

Japanese-language Written Opinion (PCT/ISA/237) dated Mar. 26, 2013 (three (3) pages).
European Search Report issued in counterpart European Application No. 13874968.4 dated Aug. 5, 2016 (three pages).

* cited by examiner

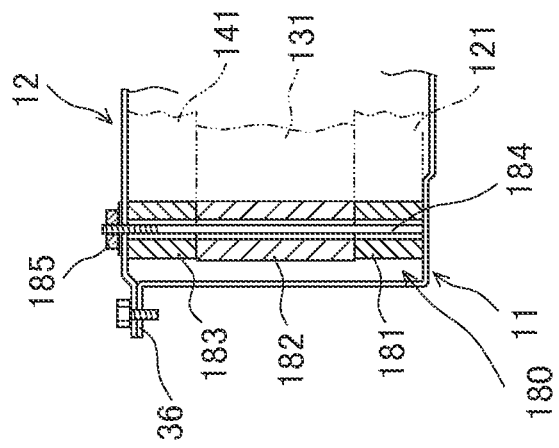
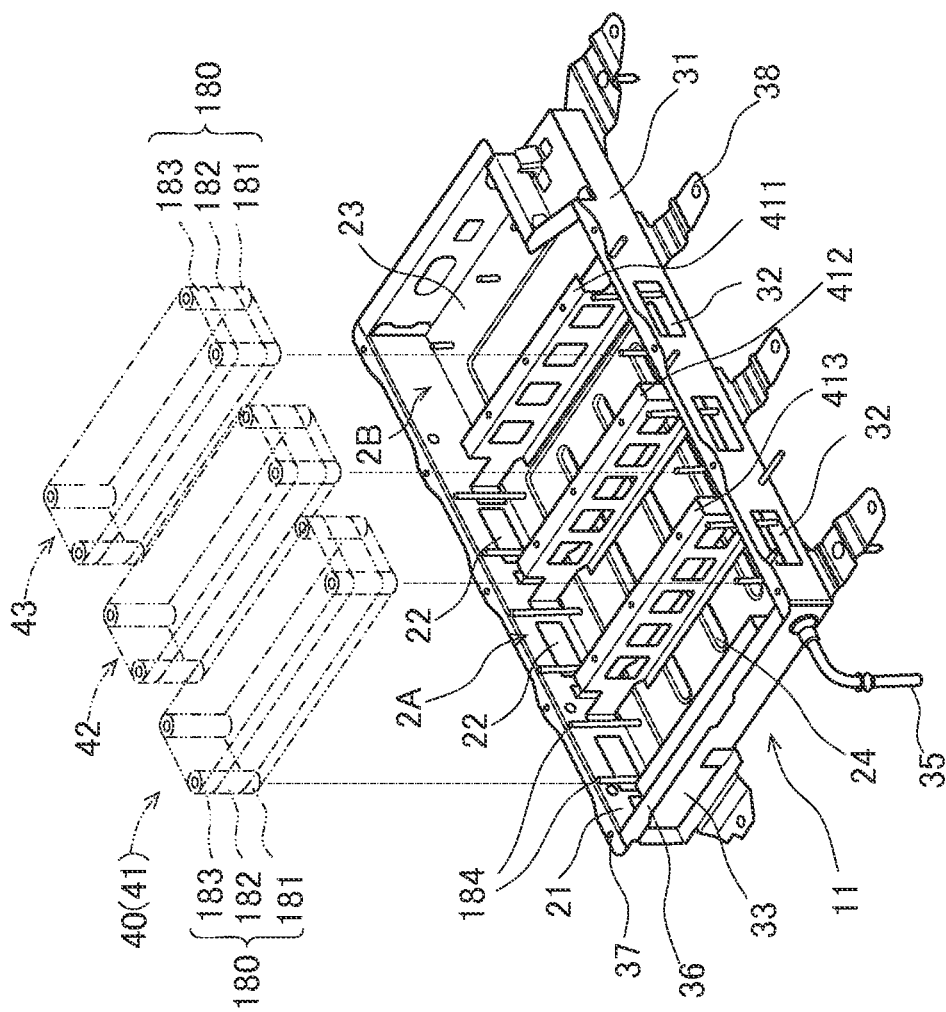

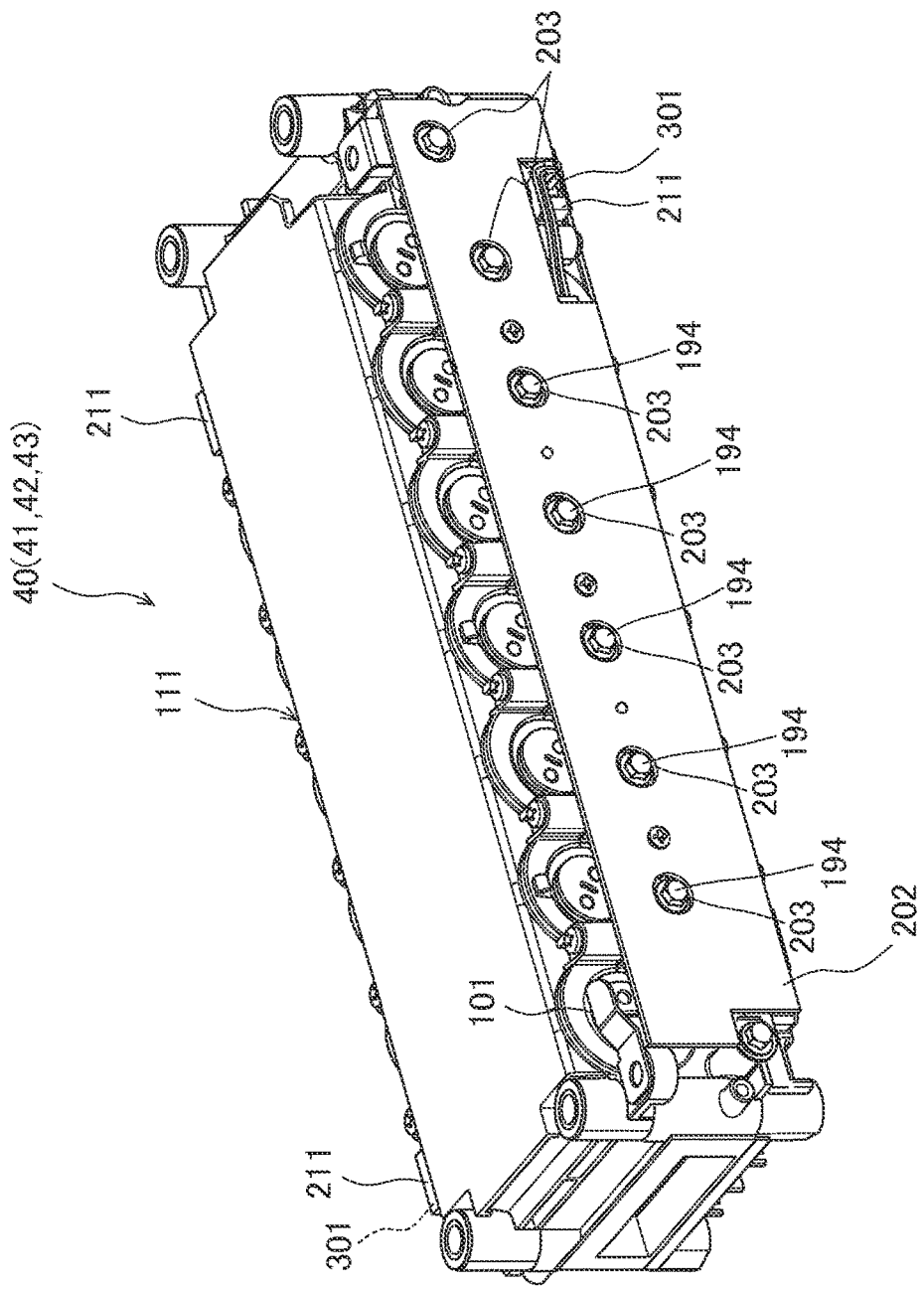

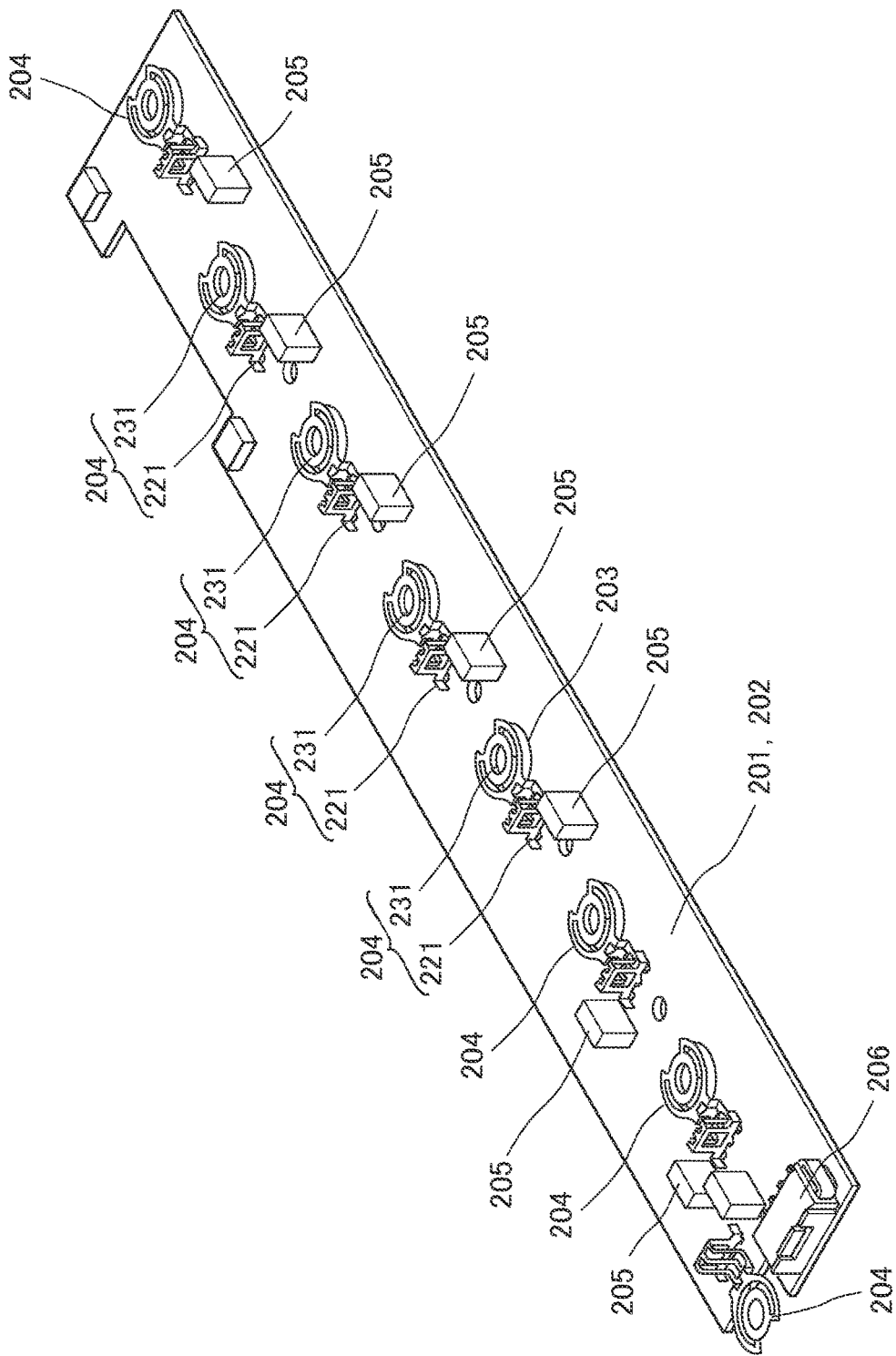

BATTERY BLOCK AND SECONDARY BATTERY MODULE

TECHNICAL FIELD

The present invention relates to a battery block holding a plurality of battery cells, and a secondary battery module.

BACKGROUND ART

Conventionally, a battery case housing a plurality of battery cells is provided with a voltage detection circuit board to detect the voltage of each battery cell. For example, Patent Literature 1 shows the structure of a pack battery including a battery core (1) storing a plurality of batteries (2) in a battery case (3), and a circuit board (4) connected to the batteries (2) of the battery core (1) via leads and secured at a fixed position in the battery core (1).

CITATION LIST

Patent Literature

Patent Literature 1: JP 2006-134801 A

SUMMARY OF INVENTION

Technical Problem

The battery cells, the battery case, the circuit board and the like have mutually different thermal expansion coefficients. Thus, connection portions between the battery cells and the circuit board may be loaded under high temperature environment or low temperature environment. As a result, peeling or cracking may develop, resulting in connection failure. Further, the connection portions may be loaded by size error of the various members, possibly resulting in peeling or cracking and causing contact failure.

The present invention was made in view of the problem, and an object of the present invention is to provide a battery block capable of reducing stress acting on a connection portion due to thermal expansion/contraction or size error.

Solution to Problem

In order to solve the problem, a battery block according to the present invention includes a holding case holding a plurality of battery cells; a plurality of conductive members arranged along a side surface of the holding case and electrically connecting corresponding battery cells; a voltage detection board disposed opposite the side surface of the holding case to detect a voltage of the battery cells; and a plurality of voltage detection terminals disposed on the voltage detection board and respectively electrically connected to the plurality of conductive members. In the voltage detection terminals, a securing portion secured to the voltage detection board and a connection portion connected to the conductive members are disposed along an arranged direction, with a bend portion which is elastically deformable at least in the arranged direction disposed between the securing portion and the connection portion.

Advantageous Effects of Invention

According to the present invention, the stress that acts on the connection portion due to thermal expansion/contraction or size error can be reduced. Thus, the state of voltage detection from the conductive members connecting the battery cells can be stabilized, for example. Other problems, configurations, and effects will become apparent from the following description of embodiments.

BRIEF DESCRIPTION OF DRAWINGS

FIG. 1B showing a perspective view from forward right.

FIG. 13A is a schematic view illustrating an operation state of housing the battery block of FIG. 4 or FIG. 5 in a lower case, FIG. 13B showing a cross sectional view of the main part as housed.

FIG. 14 is a perspective view of the battery block to which the voltage detection board is attached.

FIG. 15 is a perspective view of a back surface of the voltage detection board.

DESCRIPTION OF EMBODIMENTS

In the following, an embodiment of a secondary battery module using a battery block according to the present invention will be described with reference to the drawings.

In the present embodiment, as an example of the secondary battery module, a lithium ion battery device will be described. The lithium ion battery device according to the present embodiment is applied to a vehicle-mounted power supply device in an electric motor drive system for an electric vehicle, such as an electric automobile. The concept of the electric automobile includes, for example, a hybrid electric automobile provided with an internal combustion engine and an electric motor as vehicle drive sources, and a purely electric automobile using an electric motor as the sole drive source of the vehicle.

Figure 1A:
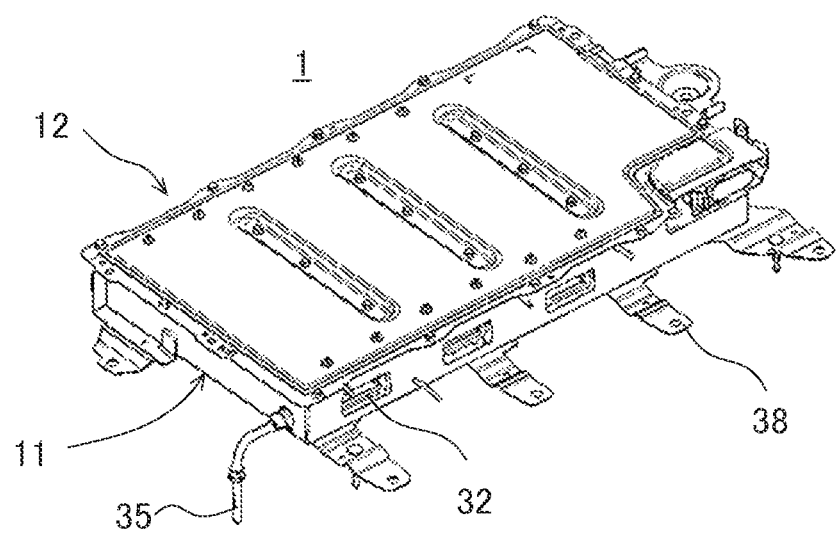
FIGS. 1A and 1B illustrate an exterior configuration of an embodiment of a secondary battery, module using battery blocks according to the present invention, FIG. 1A showing a perspective view from forward left.
Figure 1B:
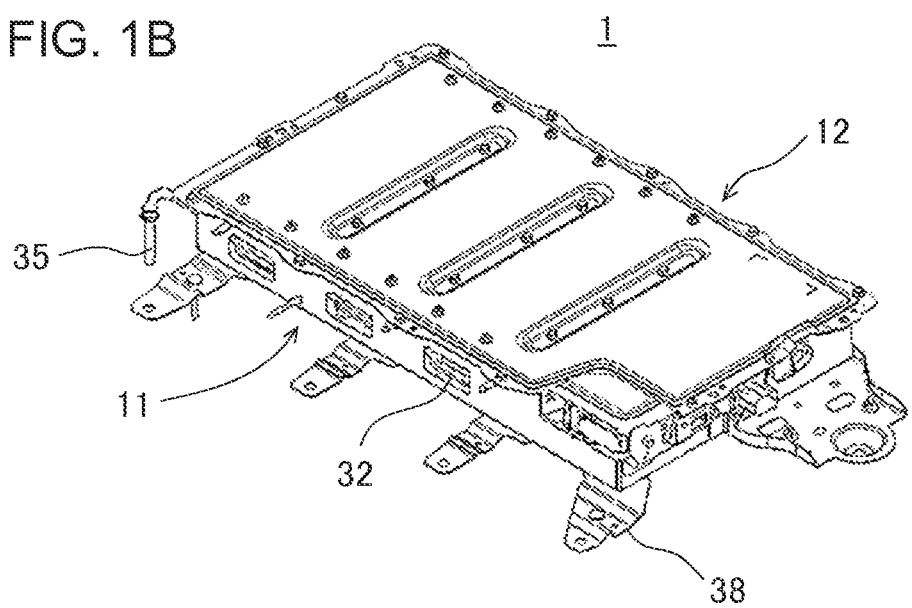
Figure 2:
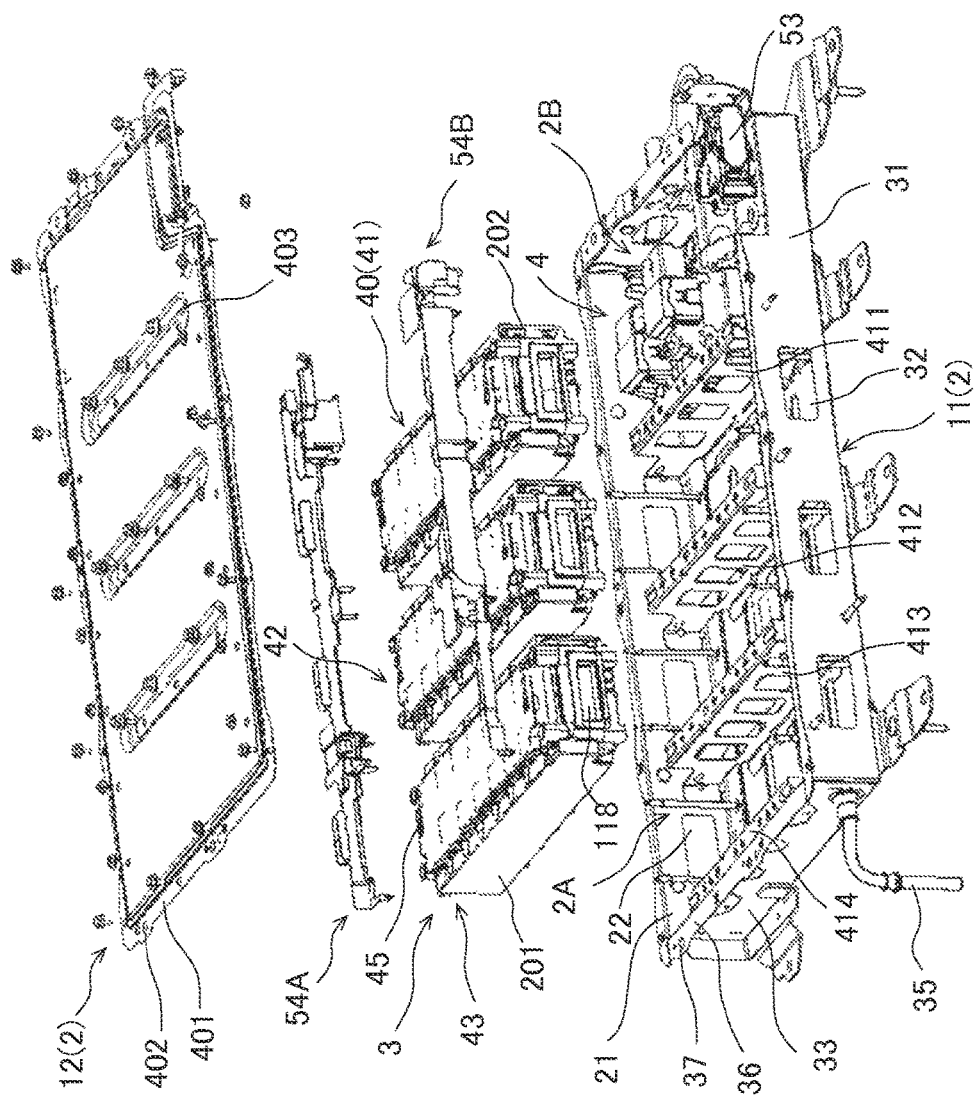
FIG. 2 is an exploded perspective view of the secondary battery module of FIG. 1.
Figure 3:
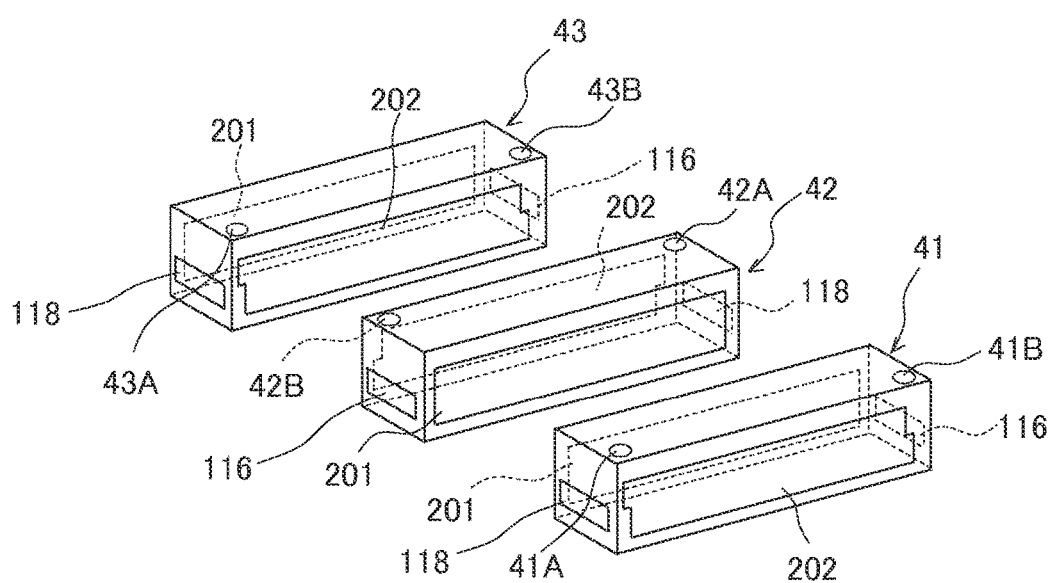
FIG. 3 is a schematic view indicating a state of arrangement of the battery blocks housed in the secondary battery module of FIG. 1.

With reference to FIG. 1 to FIG. 3, an overall configuration of the lithium ion battery device will be described. FIG. 1 is a perspective view of an exterior configuration of the lithium ion battery device, (a) showing a state as viewed from forward left, and (b) showing a state as viewed from forward right. FIG. 2 is an exploded perspective view of the secondary battery module of FIG. 1. FIG. 3 is a schematic view illustrating a state of arrangement of battery blocks. The following description will be made by referring to the upstream side of cooling air as being a front side and the downstream side of cooling air as being a rear side, regardless of the mount position or direction of the lithium ion battery device.

The lithium ion battery device 1 has a configuration such that a battery unit 3 and a control unit 4 are housed in a module housing 2. As illustrated in FIG. 1 and FIG. 2, the module housing 2 has a laterally long rectangular box shape extending in a planar manner, including a lower case 11 with an upper opening and having an housing space, and an upper lid 12 closing the upper opening of the lower case 11. The lower case 11 has a dish-like shape with a predetermined depth. The upper lid 12 has a flat plate shape closing the top of the lower case 1. The upper lid 12 and the lower case 11 are formed by pressing metal thin plate, for example. The lower case 11 includes a housing front wall portion 21 and a housing rear wall portion 31 spaced apart from and facing each other in a front-rear direction of the module housing 2. The housing front wall portion 21 and the housing rear wall portion 31 are respectively provided with intake openings 22 and exhaust openings 32 for circulating cooling air as refrigerant in the battery blocks 40. In the illustrated example, three each of the intake openings 22 and the exhaust openings 32 are formed in correspondence with the three battery blocks that are housed.

In the module housing 2, a battery unit housing area 2A for housing the battery unit 3 is formed on one side in the lateral direction of the module housing 2. On the other side in the lateral direction, a control unit housing area 2B for housing the control unit 4 is formed.

The battery unit 3 includes three battery blocks 40, i.e., a first battery block 41, a second battery block 42, and a third battery block 43. The battery blocks 41 to 43 have a longitudinal block shape, and are disposed in parallel adjacent to each other with their longitudinal directions parallel with each other. In the present embodiment, the battery blocks are housed extending in the front-rear direction of the module housing 2 in the lower case 11, with the first battery block 41, the second battery block 42, and the third battery block 43 arranged in that order in a direction away from the control unit housing area 2B.

In the battery blocks 41 to 43, as illustrated in the schematic view of FIG. 3, positive electrode terminals 41A to 43A and negative electrode terminals 41B to 43B are respectively provided at locations on both sides in the longitudinal direction. In the present embodiment, the first battery block 41 and the second battery block 42 are disposed in parallel, with the end of the first battery block 41 on the positive electrode terminal 41A side and the end of the second battery block 42 on the negative electrode terminal 42B side opposed to each other, and with the end of the first battery block 41 on the negative electrode terminal 41B side and the end of the second battery block 42 on the positive electrode terminal 42A side opposed to each other.

The second battery block 42 and the third battery block 43 are disposed in parallel, with the end of the second battery block 42 on the negative electrode terminal 42B side and the end of the third battery block 43 on the positive electrode terminal 43A side opposed to each other, and with the end of the second battery block 42 on the positive electrode terminal 42A side and the end of the third battery block 43 on the negative electrode terminal 43B side opposed to each other.

The negative electrode terminal 41B of the first battery block 41 and the positive electrode terminal 42A of the second battery block 42 are electrically connected, and the negative electrode terminal 42B of the second battery block 42 and the positive electrode terminal 43A of the third battery block 43 are electrically connected, respectively with busbars, which are not shown. The second battery block 42 and the third battery block 43 can be electrically connected or disconnected using a service disconnect (SD) switch 53. The SD switch 53 is a safety device provided to ensure safety during maintenance or inspection of the lithium ion battery device 1. The SD switch, which includes an electric circuit in which a switch and a fuse are electrically connected in series, is operated by service personnel at the time of maintenance or inspection.

The six external terminals from the positive electrode terminal 41A of the first battery block 41 to the negative electrode terminal 43B of the third battery block 43 are connected to external terminals, not shown, of the control unit 4, with the battery blocks connected in series via two harness guides 54A, 54B (of which details will be described later) laterally extending over the module housing 2. The battery blocks 40 include two voltage detection boards 201, 202 disposed along the side surfaces in the longitudinal direction of the battery blocks, and a temperature detection sensor 45. The voltage detection boards 201, 202 and the temperature detection sensor 45 are connected to a control device (not shown) of the control unit 4 via voltage detection lines and sensor lines, not shown, wired in the harness guides 54A, 54B.

Figure 4:
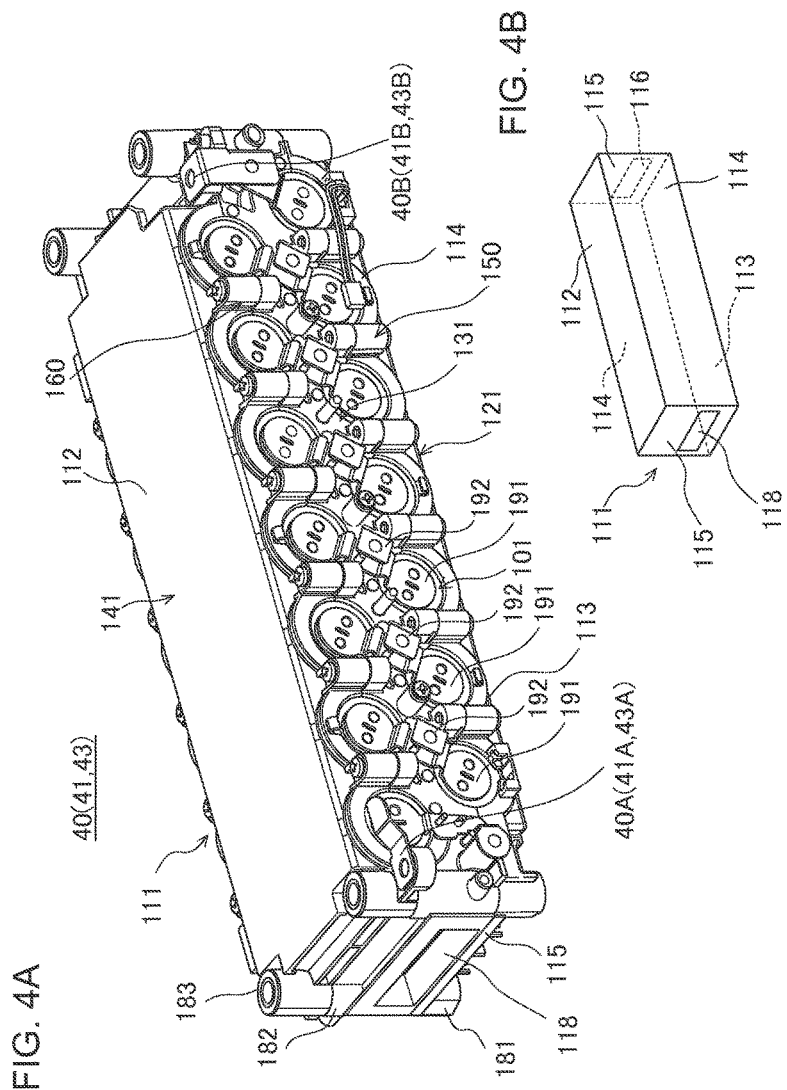
FIG. 4A is a perspective view of the battery block housed in the secondary battery module of FIG. 1, FIG. 4B being a schematic view showing a plane configuration and a refrigerant circulation opening of the block.

As illustrated in FIG. 4, the battery blocks 40 have a configuration such that a plurality of battery cells 101 is held in the holding case 111. In the present embodiment, the battery cells 101 are arranged in two, upper and lower, layers. As illustrated in FIG. 4, the holding case 111 has a longitudinal hexahedral shape and includes an upper surface portion 112 and a lower surface portion 113 spaced apart from and opposed to each other in the upper-lower direction and extending with a substantially constant width in the longitudinal direction; a pair of longitudinal wall surface portions 114, 114 spaced apart from and opposed to each other in a widthwise direction and extending between the respective long sides of the upper surface portion 112 and the lower surface portion 113; and a pair of end surface portions 115, 115 spaced apart from and opposed to each other in the longitudinal direction and extending between the respective short sides of the pair of longitudinal wall surface portions 114, 114, the upper surface portion 112, and the lower surface portion 113.

At both ends of the holding case 111 in the longitudinal direction, refrigerant circulation openings for circulating refrigerant through the battery blocks 40 are provided. As the refrigerant circulation openings, for example, opening portions 116, 118 are provided in the end surface portions 115, 115 on both sides of the holding case 111 in the longitudinal direction, providing a refrigerant inlet for introducing cooling air into the holding case 111, and a refrigerant outlet for guiding the cooling air that has passed through the holding case 111 out of the holding case 111. In the holding case 111, a cooling passageway is formed so that the cooling air can be caused to flow into the holding case 111 via the refrigerant inlet, circulate through the holding case 111 along the longitudinal direction, and then flow out of the refrigerant outlet.

The battery blocks 40, when housed in the module housing 2, are disposed with the front end surface portion 115 of the holding case 111 opposed to the housing front wall portion 21, and with one of the opening portion 116 or 118 of the end surface portion 115 opposed to the intake openings 22 of the housing front wall portion 21 as the refrigerant inlet. The rear end surface portion 115 of the holding case 111 is opposed to the housing rear wall portion 31, with the other of the opening portion 116 or 118 of the rear end surface portion 115 opposed to the exhaust openings 32 of the housing rear wall portion 31 as the refrigerant outlet.

In the module housing 2, the housing front wall portion 21 and the case front end surface portion 115 are abutted; the housing rear wall portion 31 and the case rear end surface portion 115 are abutted; and the refrigerant inlet of the case front end surface portion 115 and the intake openings 22 of the housing front wall portion 21 are placed in communication, with the refrigerant outlet of the case rear end surface portion 115 and the exhaust openings 32 of the housing rear wall portion 31 being placed in direct communication. In this state, the housing front wall portion 21 and the case front end surface portion 115 are tightly adhered to each other, and so are the housing rear wall portion 31 and the case rear end surface portion 115, whereby entry of gas leaked in the module housing 2 can be prevented. Further, sealing material may be disposed between the housing front wall portion 21 and the case front end surface portion 115, and between the housing rear wall portion 31 and the case rear end surface portion 115.

Thus, the refrigerant, such as air, that has been introduced via the intake openings 22 of the module housing 2 passes through the refrigerant inlet of the battery blocks 40 and is introduced into the blocks. The refrigerant then passes through the refrigerant outlet and is discharged out of the exhaust openings 32 of the module housing 2, whereby the plurality of battery cells 101 arranged in the battery blocks 40 can be cooled.

A space region formed in an upper portion between the case front end surface portion 115 and the intake openings 22 of the housing front wall portion 21, and a space region formed in an upper portion between the case rear end surface portion 115 and the exhaust openings 32 of the housing rear wall portion 31 are used as wiring passageways. The harness guides 54A, 54B are disposed in the space regions so as to pass wiring for connecting the first to third battery blocks 41 to 43 and the control unit 4. The wiring passed through the harness guides 54A, 54B may include a harness connecting the negative electrode terminal 43B of the third battery block 43 and the control unit 4, a voltage detection line for transmitting detection signals of voltages of the battery blocks 41 to 43 to the control unit 4, and a sensor line for transmitting a detection signal from the temperature detection sensor 45 to the control unit 4.

<Battery Block>

Figure 5:
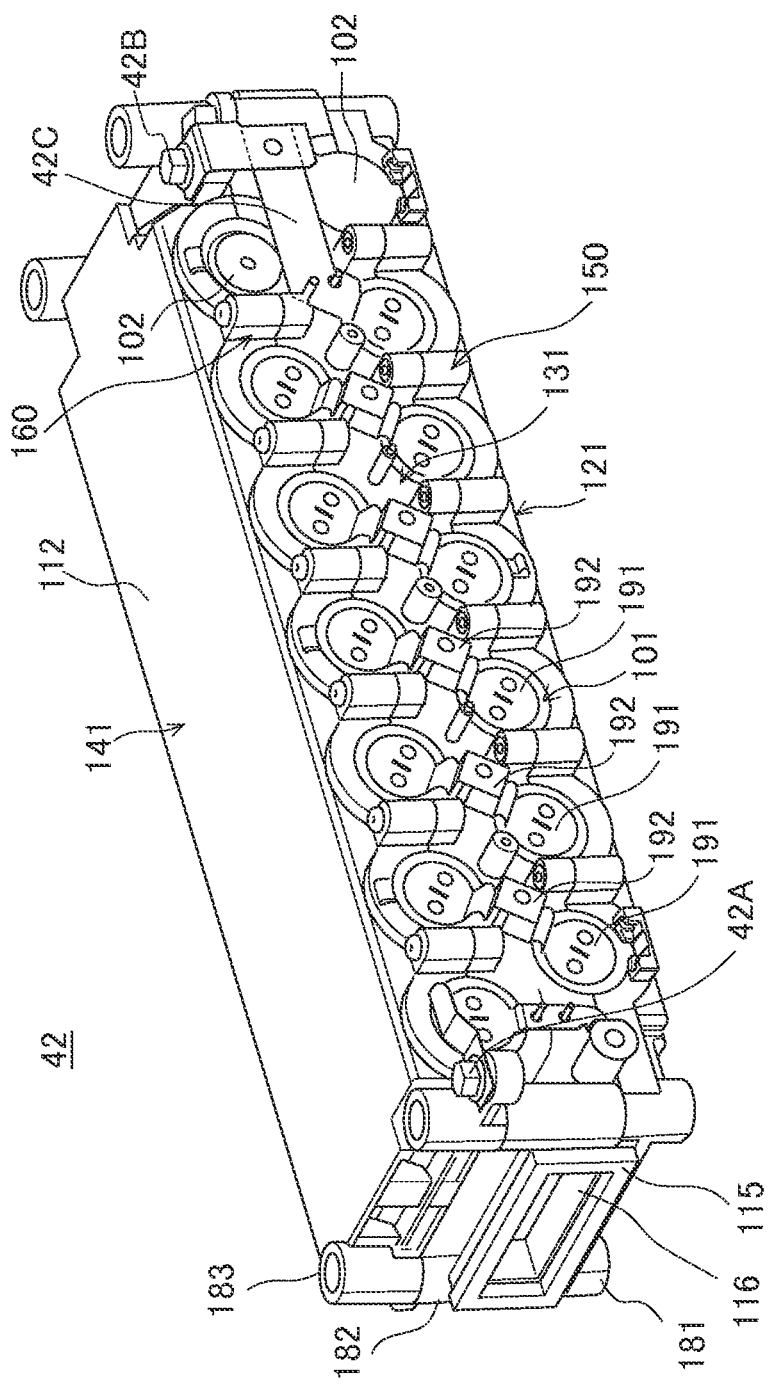
FIG. 5 is a perspective view of another battery block housed in the secant battery module of FIG. 1.
Figure 6:
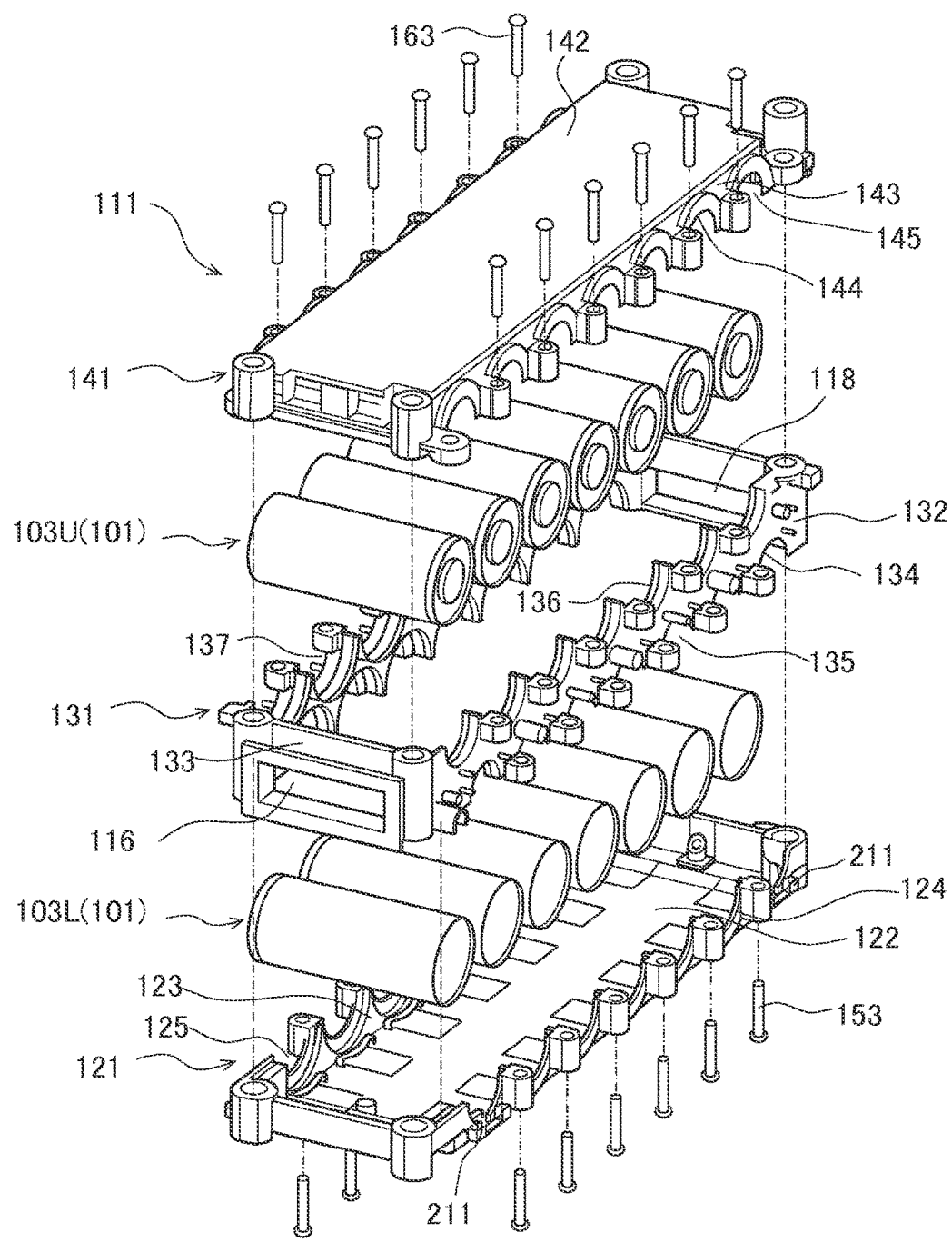
FIG. 6 is an exploded perspective view of the battery block of FIG. 4.
Figure 7:
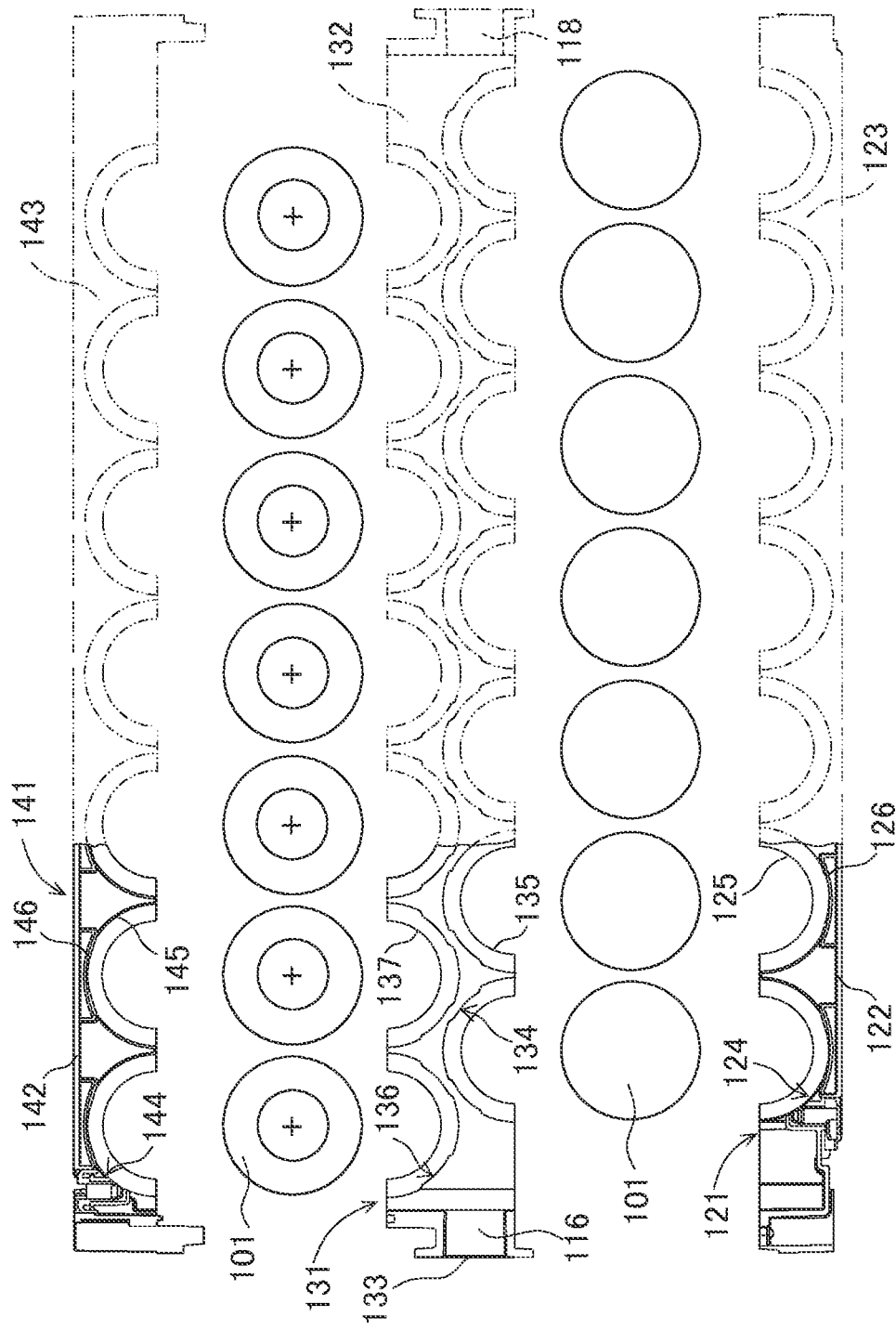
FIG. 7 is an exploded cross sectional view of the battery block of FIG. 4.
Figure 8:
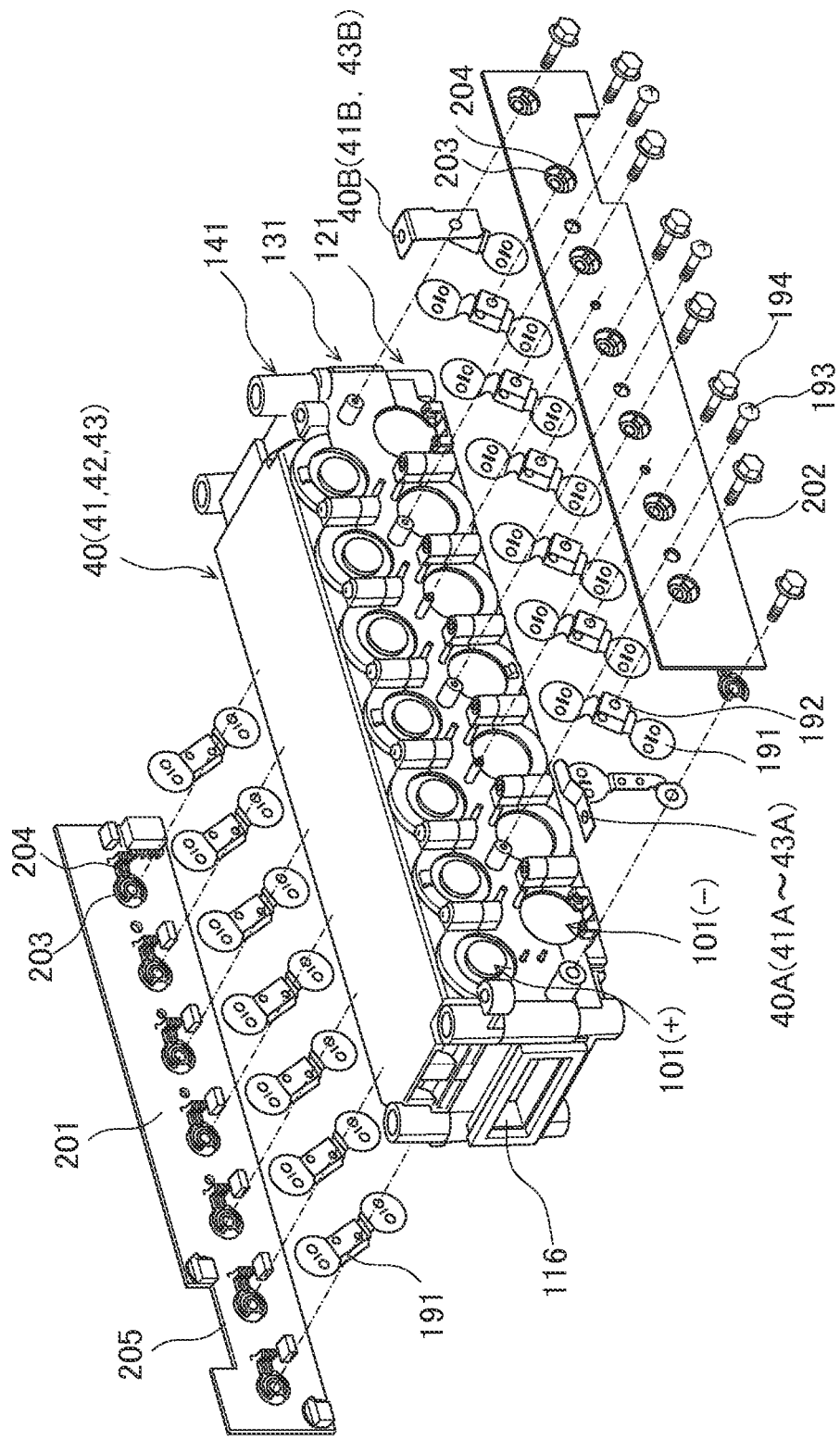
FIG. 8 is an exploded perspective view showing a state in which conductive members of the battery block of FIG. 4 are disassembled and prior to assembly of a voltage detection board.

The configuration of the battery block according to the present embodiment will be described with reference to FIG. 4 to FIG. 8. FIG. 4 is a perspective view of the battery block housed in the secondary battery module of FIG. 1, illustrating its plane configuration and refrigerant circulation openings. FIG. 5 is a perspective view of another battery block housed in the secondary battery module of FIG. 1. FIG. 6 is an exploded perspective view of the battery block of FIG. 4. FIG. 7 is an exploded cross sectional view of the battery block of FIG. 4. FIG. 8 is an exploded perspective view illustrating a state in which conductive members of the battery block of FIG. 4 are broken apart and prior to assembly of the voltage detection boards.

Of the battery blocks 40, the first battery block 41 and the third battery block 43 are disposed in parallel in the module housing 2 with the positive electrode terminals 41A, 43A and the negative electrode terminals 41B, 43B respectively having the same positions. The second battery block 42 is disposed between the first battery block 41 and the third battery block 43 with the positive electrode terminal 42A and the negative electrode terminal 42C disposed in opposite directions from the first battery block 41 and the third battery block 43.

Basically, the first to third battery blocks 41 to 43 have the same configuration in their exterior shape. The first battery block 41 and the third battery block 43 have a configuration with 14 battery cells 101. The second battery block 42 has a configuration with 12 battery cells 101 and two dummy cells 102.

In the first battery block 41 and the third battery block 43, the 14 battery cells 101 are arranged with the positive electrodes and the negative electrodes of the adjacent battery cells 101 diagonally connected via conductive members 191. The first battery cell 101 and the last battery cell 101 are respectively connected to external lead terminals, which are connected to the positive electrode terminal 40A (41A, 43A) or the negative electrode terminal 40B (41B. 43B).

The second battery block 42, which has 14 spaces, including two dummy cells 102 arranged at the end to fill the spaces. In the second battery block 42, the mutually adjacent positive electrodes and negative electrodes of the 12 battery cells 101 are connected with the conductive members 191. To the last battery cell 101 adjacent to the dummy cells 102, as illustrated in FIG. 5, an external lead terminal 42C with such a shape as to bypass the dummy cells 102 is connected. The external lead terminal 42C is led from the electrode of the lower battery cell 101 toward the dummy cell 102 diagonally above, bent at a center position in the height direction of the second battery block 42, and extended toward the outside in the longitudinal direction of the second battery block 42. At the end of the second battery block 42, the external lead terminal 42C is connected to the negative electrode terminal 42B. Thus, even in the second battery block 42 including the dummy cells 102, the external terminals can be disposed at the end positions of the second battery block 42, as in the first and the third battery blocks 41, 43. Accordingly, the plurality of batteries blocks 40 can be housed and assembled in the same steps. The negative electrode terminal 42B may be a positive electrode side terminal.

The battery blocks 40 have the configuration such that a plurality of battery cells 101 is held in the hold holding case 111, with the battery cells 101 electrically connected in series via the conductive members, forming an assembled battery. As the battery cells 101, lithium ion battery cells are used.

The battery cells 101 are cylindrical structural members including a battery container injected with electrolytic solution, with constituent components, such as a battery element and a safety valve, housed in the container. The safety valve on the positive electrode side is a rupture valve that is ruptured when the pressure inside the battery container reaches a predetermined pressure due to abnormality, such as overcharging. The safety valve functions as a fuse mechanism for disconnecting the electrical connection between a battery lid and the positive electrode side of the battery element by rupturing. The safety valve also functions as a depressurization mechanism for ejecting gas generated in the battery container, namely a mist of carbonic acid gas (ejected material) containing the electrolytic solution, out of the battery container.

A rupture groove is also provided on the negative electrode side of the battery container. The rupture groove ruptures when the pressure inside the battery container reaches a predetermined pressure due to abnormality, such as overcharging. Thus, the gas generated in the battery container can be also ejected from the negative electrode terminal side. The lithium ion battery cells 101 have a nominal output voltage of 3.0 to 4.2 volts, and an average nominal output voltage of 3.6 volts.

The holding case 111 is configured to hold a stack of battery cell arranged bodies 103, each of which including a plurality of battery cells 101 arranged in parallel which are laid on their sides, with the central axis of the battery cells 101 extending across the pair of end surface portions 115, 115 in the widthwise direction of the holding case 111.

A battery cell arranged body 103L in the lower layer and a battery cell arranged body 103U in the upper layer are held in a state of being mutually displaced in a column direction. In the present embodiment, the battery cell arranged bodies are held in a state of being displaced by a half cell in the longitudinal direction of the holding case 111. Namely, the battery cell arranged body 103L of the lower layer and the battery cell arranged body 103U of the upper layer have the same arrangement pitch, and the upper and lower arranged bodies are arranged while being displaced by a half pitch. By thus holding the lower-layer battery cell arranged body 103L and the upper-layer battery cell arranged body 103U in a state of being displaced in the column direction, the lower-layer battery cell arranged body 103L and the upper-layer battery cell arranged body 103U can be disposed close to each other, whereby the size in a direction perpendicular to the column direction can be decreased. Accordingly, the height direction of the assembled battery as a whole can be decreased, and the height of the battery blocks 40 can be decreased.

The lower-layer battery cell arranged body 103L and the upper-layer battery cell arranged body 103U are arranged such that the positive electrodes and the negative electrodes of the respective battery cells 101 are oppositely disposed. Specifically, the battery cell arranged bodies are held such that, in the lower-layer battery cell arranged body 103L, the positive electrodes of the battery cells 101 are positioned on one side in the widthwise direction of the holding case 111, while in the upper-layer battery cell arranged body 103U, the negative electrodes of the battery cells 101 are positioned on the opposite side in the widthwise direction of the holding case.

The holding case 111 includes three members of a lower holding frame member 121, a middle holding frame member 131, and an upper holding frame member 141. The holding case 111 is configured such that the lower-layer battery cell arranged body 103L is held between the lower holding frame member 121 and the middle holding frame member 131, and the upper-layer battery cell arranged body 103U is held between the middle holding frame member 131 and the upper holding frame member 141.

In the holding case 111, in an assembled state, the battery cells 101 are exposed forming a cooling passageway in the case extending in the longitudinal direction. In the pair of end surface portions 115, 115 of the holding case 111, the opening portions 116, 118 in communication with both ends of the passageway portion are formed. Namely, the battery cells 101 arranged above and below have a slight gap formed between their outer peripheral surfaces. Thus, the battery cells 101 are configured to be cooled as air or refrigerant enters via one opening portion 116 and leaves via the other opening portion 118 while flowing in the gap.

Depending on the direction in which the battery blocks 40 are fitted in the module housing 2, namely, depending on whether the battery blocks 40 are used as the first battery block 41 or the second battery block 42, one opening portion 116 becomes the refrigerant inlet or the refrigerant outlet, and the other opening portion 118 becomes the refrigerant outlet or the refrigerant inlet (see FIG. 3 to FIG. 5). In the present embodiment, in the first battery block 41, the opening portion 116 on the positive electrode terminal 41A side becomes the refrigerant inlet while the opening portion 118 on the negative electrode terminal 41B side becomes the refrigerant outlet. In the second battery block 42, the opening portion 118 on the negative electrode terminal 42B side becomes the refrigerant inlet while the opening portion 116 on the positive electrode terminal 42A side becomes the refrigerant outlet.

As illustrated in FIG. 5 and FIG. 6, the lower holding frame member 121 includes a flat plate-shaped lower surface portion 122 extending with a constant lateral width, and a pair of lower longitudinal wall surface portions 123, 123 extending upward from both side edges in the widthwise direction of the lower surface portion 122 and facing each other. The lower surface portion 122 of the lower holding frame member constitutes the lower surface portion 113 of the holding case 111. The lower longitudinal wall surface portions 123, 123 constitute lower portions of the longitudinal wall surface portions 114, 114 of the holding case 111.

The pair of lower longitudinal wall surface portions 123, 123 is provided with lower-layer lower holder portions 124 respectively holding the lower side portions of the battery cells 101 constituting the lower-layer battery cell arranged body 103L, and open window portions 125 respectively exposing the end surfaces on both sides in the central axis direction of the battery cells 101 held in the lower-layer lower holder portion. Each of the lower-layer lower holder portions 124 includes a lower-layer lower recessed surfaces that is cut out in semicircular-arc shape from an upper side portion of the lower longitudinal wall surface portions 123, 123 toward the lower surface portion 122 in such a manner as to contact the outer peripheral surface at the ends of the battery cells 101, and an opposed surface opposed to the end surfaces in the central axis direction of the battery cells 101. The lower-layer lower holder portions 124 constitute, in cooperation with lower-layer upper holder portions 134 of central longitudinal wall surface portions 132, 132 as will be described later, a lower holder portion holding the lower-layer battery cell arranged body 103L while regulating movement of the battery cells 101 in their central axis direction and radial direction.

The open window portions 125 are formed in the lower longitudinal wall surface portions 123, 123, allowing a center portion of the end surfaces of the battery cells 101 held in the lower-layer lower holder portions 124 to be exposed laterally of the protect case 111.

The middle holding frame member 131 includes a pair of the central longitudinal wall surface portions 132, 132 extending with a constant height width and opposed to each other, and a pair of end surface portions 133, 133 disposed across the short sides at both ends in the longitudinal direction of the central longitudinal wall surface portions 132, 132. When the middle holding frame member 131 is placed over and coupled with the lower holding frame member 121, the central longitudinal wall surface portions 132, 132 are continuously connected with the upper portions of the lower longitudinal wall surface portions 123, 123 of the lower holding frame member 121, constituting a height direction center portion of the longitudinal wall surface portions 114, 114 of the holding case 111. The end surface portions 133, 133 of the middle holding frame member 131, 131 constitute the end surface portions 115, 115 of the holding case 111, and include the opening portions 116, 118.

The pair of central longitudinal wall surface portions 132, 132 are provided with the lower-layer upper holder portions 134 respectively holding the upper side portions of the battery cells 101 held in the lower holding frame member 121, and upper-layer lower holder portions 136 respectively holding the lower side portions of the battery cells constituting the upper-layer battery cell arranged body. The central longitudinal wall surface portions 132, 132 are also provided with open window portions 135, 137 respectively exposing the end surfaces on both sides in the central axis direction of the battery cells 101 held in the lower-layer upper holder portions 134, and the end surfaces on both sides in the central axis direction of the battery cells 101 held in the upper-layer lower holder portions 136.

The lower-layer upper holder portions 134 include a lower-layer upper recessed surface that is cut out in semicircular-arc shape from the lower side portion toward the upper side portion of the central longitudinal wall surface portions 132 in such a manner as to contact the outer peripheral surface of the ends of the battery cells 101, and an opposed surface opposed to the end surfaces in the central axis direction of the battery cells 101. The lower-layer upper holder portions 134 constitute, in cooperation with the lower-layer lower holder portions 124 of the lower holding frame member 121, the lower holder portion holding the lower-layer battery cell arranged body 103L while regulating movement of the battery cells 101 in the central axis direction and the radial direction.

The upper-layer lower holder portions 136 include an upper-layer lower recessed surfaces that is cut out in semicircular-arc shape from an upper side portion toward the lower side portion of the central longitudinal wall surface portions 132 in such a manner as to contact the outer peripheral surfaces of the ends of the battery cells 101, and an opposed surface opposed to the end surfaces in the central axis direction of the battery cells 101. The upper-layer lower holder portions 136 constitute, in cooperation with upper-layer upper holder portions 144 of the upper holding frame member 141 which will be described later, an upper holder portion holding the upper-layer battery cell arranged body 103U while regulating movement of the battery cells 101 in the central axis direction and the radial direction.

The lower-layer upper holder portions 134 and the upper-layer lower holder portions 136 are disposed at positions displaced from each other by a half cell in the longitudinal direction of the middle holding frame member 131 so as to hold the lower-layer battery cell arranged body 103L and the upper-layer battery cell arranged body 103U in a state of being displaced from each other in the column direction. Thus, the centers of the upper-layer lower holder portions 136 are positioned between mutually adjacent lower-layer upper holder portions 134, with the central longitudinal wall surface portions 132 having a height smaller than the diameter of the battery cells 101.

The upper holding frame member 141 includes a flat plate-shaped upper surface portion 142 extending with a constant lateral width, and a pair of upper longitudinal wall surface portions 143, 143 extending downward from both side edges in the widthwise direction of the upper surface portion 142 and facing each other. The upper surface portion 142 of the upper holding frame member 141 constitutes the upper surface portion 112 of the holding case 111. The upper longitudinal wall surface portions 143, 143 constitute upper portions of the longitudinal wall surface portions 114 of the holding case 111.

The pair of upper longitudinal wall surface portions 143, 143 is provided with upper-layer upper holder portions 144 respectively holding the upper portions of the battery cells 101 constituting the upper-layer battery cell arranged body 103U, and open window portions 145 respectively exposing the end surfaces on both sides in the central axis direction of the battery cells 101 held in the upper-layer upper holder portions 144.

The upper-layer upper holder portions 144 include upper-layer upper recessed surfaces that are cut out in semicircular-arc shape from the lower side portions of the upper longitudinal wall surface portions 143, 143 toward the upper surface portion 142 in such a manner as to contact the outer peripheral surfaces of the ends of the battery cells 101, and opposed surfaces opposed to the end surfaces in the central axis direction of the battery cells 101. The upper-layer upper holder portions 144 constitute, in cooperation with the upper-layer lower holder portions 136 of the middle holding frame member 131, the upper holder portion holding the upper-layer battery cell arranged body 103U while regulating movement of the battery cells 101 in the central axis direction and the radial direction.

The open window portions 145 are formed in the upper longitudinal wall surface portions 143, 143 so that a center portion of the end surfaces of the battery cells 101 held in the upper-layer upper holder portions 144 can be exposed laterally of the protect case 111. The open window portions 145 and the open window portions 135 of the middle holding frame member 131 form circular openings. The open window portions 125 of the lower holding frame member 121 and the open window portions 135 of the middle holding frame member 131 form circular openings. To the electrodes of the battery cells 101 that are exposed via the openings, conductive members 191 for connection are firmly attached by welding and the like.

In the battery blocks 40 according to the present embodiment, the plurality of the cylindrical battery cells 101, arranged with their central axes in parallel in the battery blocks 40, is secured with the outer peripheral surfaces of the cells held in the radial direction between two holder members positioned opposite each other. Namely, in the battery cell arranged body 103L in which the plurality of battery cells 101 of the lower layer is arranged, the battery cells are secured with their tops and bottoms held between the two holder members of the lower holding frame member 121 and the middle holding frame member 131 in the radial direction. In the battery cell arranged body 103U in which the plurality of battery cells 101 of the upper layer is arranged, the battery cells are secured with their tops and bottoms held between the two holder members of the middle holding frame member 131 and the upper holding frame member 141 in the radial direction.

Contact portions between the three holder members, namely the lower holding frame member 121, the middle holding frame member 131, and the upper holding frame member 141, and the battery cells 101 will be described.

Figure 9:
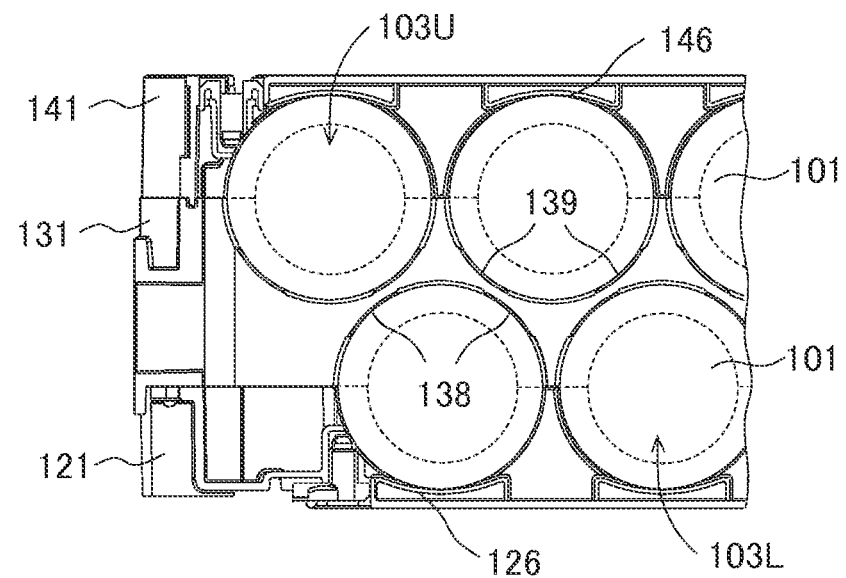
FIG. 9 is a cross sectional view of a main part of the battery block of FIG. 4.
Figure 10:
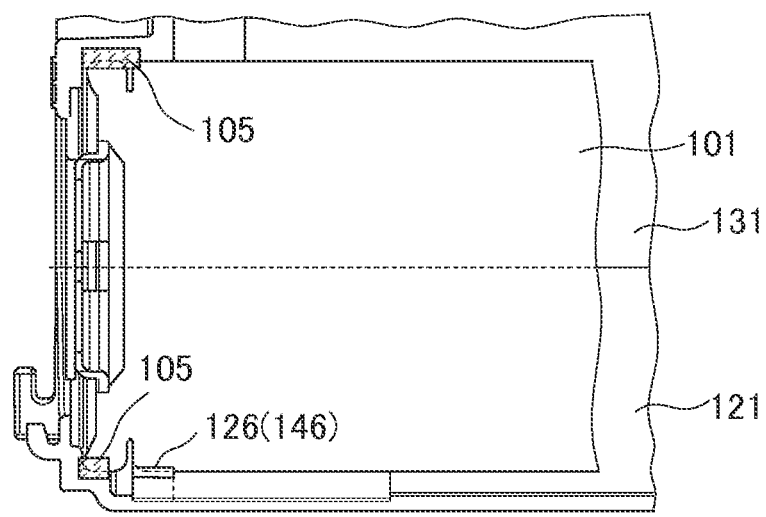
FIG. 10 is a cross sectional view of the main part showing the details of a holder portion of the battery block of FIG. 4.
Figure 11:
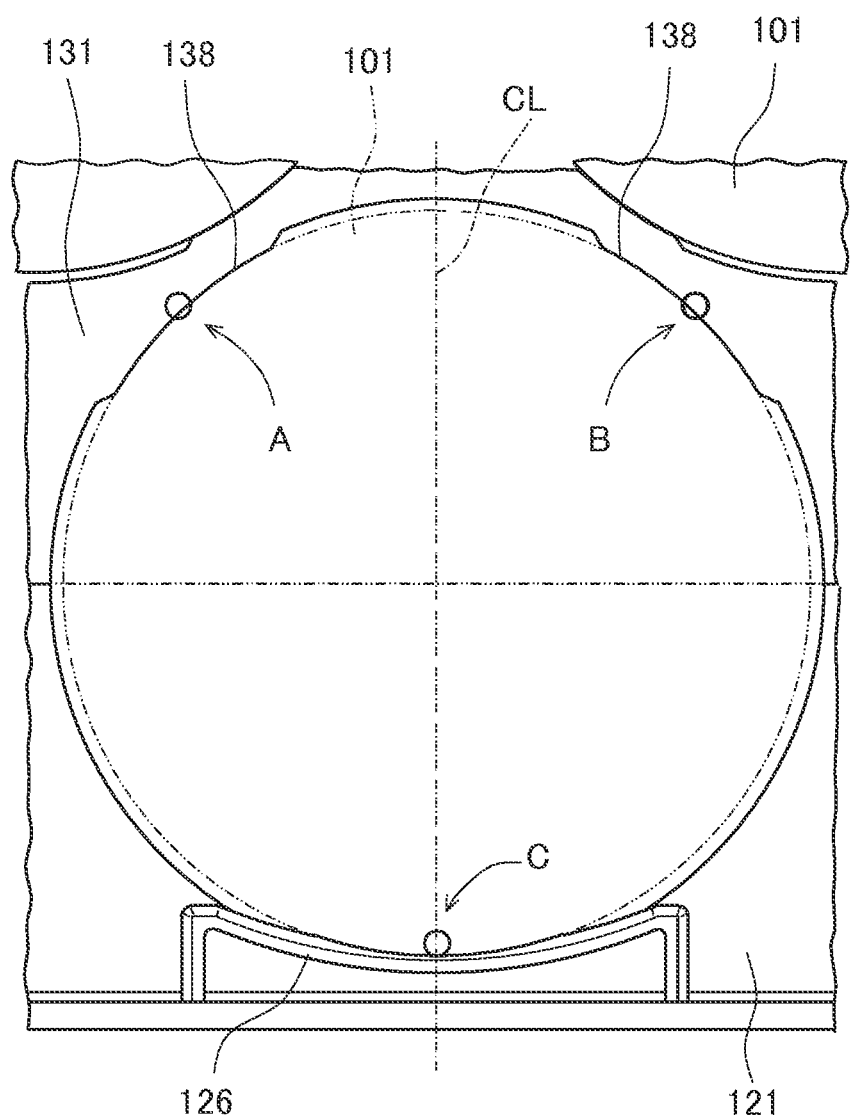
FIG. 11 is a front view of the main part of the holder portion of FIG. 9.

With reference to FIG. 9 to FIG. 11, in the lower-layer battery cell arranged body 103L, with respect to the plurality of battery cells 101, the lower holding frame member 121 is formed with the lower-layer lower recessed surfaces of semicircular-arc shape having a slightly larger radius than the radius of the outer peripheral surface of the battery cells. Along and in parallel with the lower-layer lower recessed surfaces, substantially M-shaped elastically deformable pressing portions 126 are integrally formed from resin. Meanwhile, the middle holding frame member 131 is formed with the lower-layer upper recessed surfaces of semicircular-arc shape having a radius slightly larger than the radius of the outer peripheral surface of the battery cells. The lower-layer upper recessed surfaces are formed with two protrusion portions 138. The pressing portions 126 are formed on a center line of the battery cells 101, while the two protrusion portions 138 are formed symmetrically with respect to the center line. The semicircular-arc shaped lower-layer lower recessed surfaces and lower-layer upper recessed surfaces at top and bottom are mated, forming circumferential recessed surfaces. By the circumferential recessed surfaces, the ends in the axial direction of the battery cells are surrounded from radially outside.

In the upper-layer battery cell arranged body 103U, as in the case of the lower-layer battery cell arranged body 103L, the upper holding frame member 141 is formed with the semicircular-arc shaped upper-layer upper recessed surfaces having a radius slightly larger than the radius of the outer peripheral surface of the battery cells, with substantially M-shaped elastic pressing pieces 146 integrally formed from resin along and in parallel with the upper-layer upper recessed surfaces. The middle holding frame member 131 is formed with the semicircular-arc shaped upper-layer lower recessed surfaces having a radius slightly larger than the radius of the outer peripheral surface of the battery cells, with two protrusion portions 139 formed on the upper-layer lower recessed surfaces. The elastic pressing pieces 146 are formed on the center line of the battery cells 101, and the two protrusion portions 139 are formed symmetrically with respect to the center line. With respect to the upper-layer battery cells too, the semicircular-arc shaped upper-layer lower recessed surfaces and the upper-layer upper recessed surfaces at top and bottom are mated, whereby circumferential recessed surfaces are formed, the circumferential recessed surfaces surrounding the ends in the axial direction of the battery cells from radially outside.

As illustrated in FIG. 11, three points A, B, and C in the battery cells 101 of the lower-layer battery cell arranged body 103L, namely the points A and B of contact of the two protrusion portions 138 radially contacting the outer peripheral surface of the cell and the point C at which the cell is pressed by the one pressing portion 126 radially inward, and the three points in the battery cells 101 of the upper-layer battery cell arranged body 103U, namely the two protrusion portions 139 radially contacting the outer peripheral surfaces of the cell and the point at which the cell is pressed by the one pressing portion 146 radially inward, are preferably positioned such that the two points of the protrusion portions 138 (points A and B) are symmetric with respect to the one point of the pressing portion 126, 146 (point C), with a center line CL passing the point C and the axial center at the center. Specifically, it is preferable to position the three points on an isosceles triangle having the one point of the pressing portion 126, 146 at the vertex. Alternatively, the three points may be positioned at the vertices of an equilateral triangle.

In this configuration, as illustrated in detail in FIG. 11, the plurality of battery cells 101 of the lower layer is held in a balanced and reliable manner at the three points on the outer peripheral surface of the battery cells from three directions as the two protrusion portions 138 of the middle holding frame member 131 contact the upper portion of the outer peripheral surface, while the outer peripheral surface of the battery cells are pressed upward by the pressing portions 126 of the lower holding frame member 121.

The plurality of battery cells 101 of the upper layer is held in a balanced and reliable manner at the three points on the outer peripheral surface of the battery cells from three directions as the two protrusion portions 139 of the middle holding frame member 131 contact the lower portion of the outer peripheral surface, while the outer peripheral surface of the battery cells is pressed downward by the elastic pressing pieces 146 of the upper holding frame member 141. Thus, even when the arranged battery cells 101 have slightly different outer periphery diameters, the diameter tolerance of the outer peripheral surface can be absorbed as the upper and lower pressing portions 126, 146 deform. Accordingly, even when the battery cells 101 have diameter variations, the battery cells can be stably held and secured while suppressing vibration. Further, because vibration of the battery cells can be suppressed, no load is applied to the positive electrode terminal 40A or the negative electrode terminal 40B and the like connected to the positive electrodes or negative electrodes of the battery cells by, e.g., welding, whereby disconnection or contact failure can be prevented.

While in the above example the pressing portions 126, 146 are formed in the lower holding frame member 121 and the upper holding frame member 141, with the protrusion portions 138, 139 formed in the middle holding frame member 131, they may be oppositely formed. Two protrusion portions may be formed in the lower holding frame member 121, and a pressing portion may be formed in the lower part of the middle holding frame member 131, and protrusion portions may be formed in the upper part of the middle holding frame member and a pressing portion may be formed in the lower part of the upper holding frame member 141. In this configuration, the weight of the battery cells would not act on the pressing portions, whereby the durability of the pressing portion can be increased.

Figure 12A:
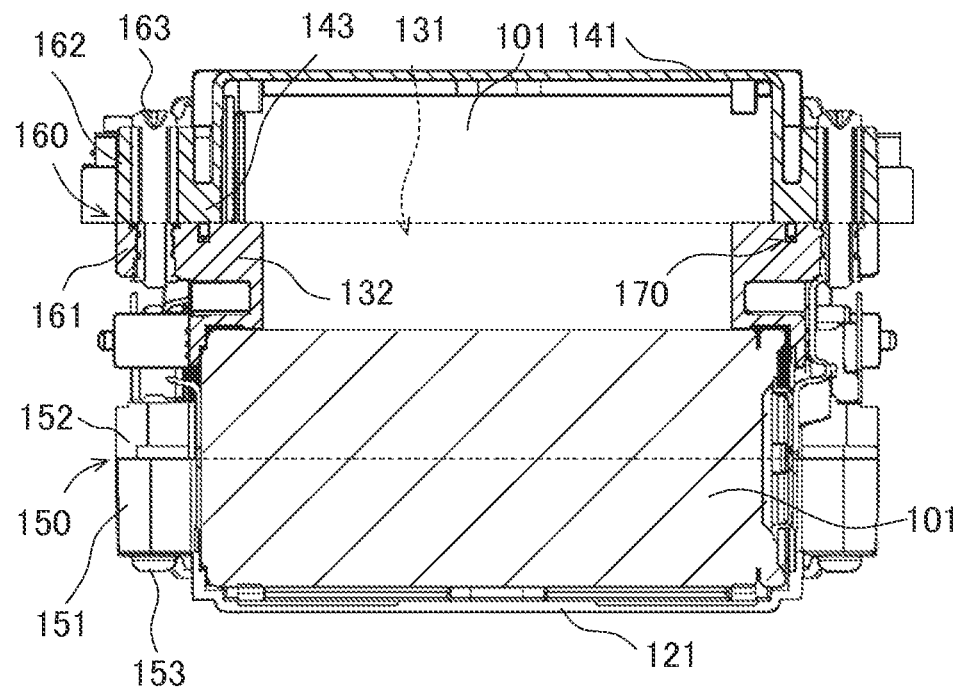
FIGS. 12A and B illustrate a fastening means and a positioning means of the battery block of FIG. 4, FIG. 12A showing a cross sectional view in fastened state and FIG. 12B showing a cross sectional view prior to fastening.
Figure 12B:
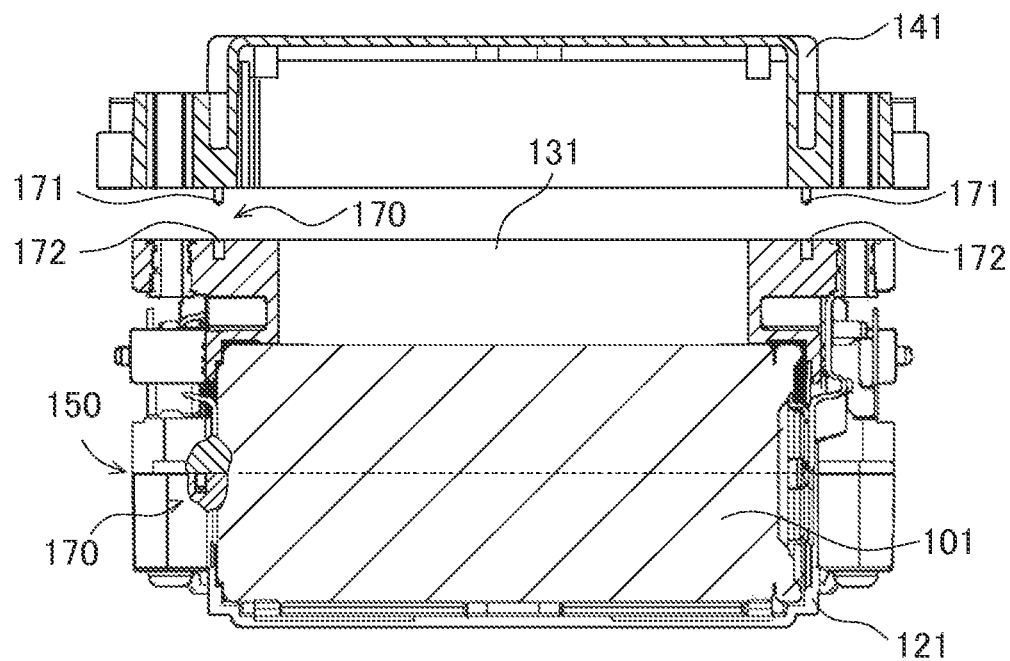

In the battery blocks 40 according to the present embodiment, the holding case 111 is provided with a lower coupling means 150 coupling the lower holding frame member 121 and the middle holding frame member 131, and an upper coupling means 160 coupling the middle holding frame member 131 and the upper holding frame member 141. By the lower coupling means, the lower holding frame member 121 and the middle holding frame member 131 are coupled to each other with the middle holding frame member 131 disposed over the lower holding frame member 121. By the upper coupling means, the middle holding frame member 131 and the upper holding frame member 141 are coupled to each other with the upper holding frame member 141 disposed over the middle holding frame member 131. With reference to FIG. 12, the coupling means 150, 160 will be described. Because the two coupling means have substantially the same configuration, the upper coupling means 160 will be described in the following.

Referring to FIG. 12, the upper coupling means 160 includes fastening boss portions 161 laterally protruding from the pair of central longitudinal wall surface portions 132, 132 of the middle holding frame member 131, and fastening boss portions 162 laterally protruding from the pair of upper longitudinal wall surface portions 143, 143, which extend downward from both side edges in the widthwise direction of the flat plate-shaped upper surface portion 142 of the upper holding frame member 141, and which are facing each other. The fastening boss portions 161 and the fastening boss portions 162 are fastened using upper fastening screws 163, whereby the upper holding frame member 141 is securely fastened to the upper portion of the middle holding frame member 131. The fastening boss portions 162 of the upper holding frame member 141 are formed at intermediate positions of the plurality of upper-layer upper recessed surfaces, which are cut out in semicircular-arc shape from the lower side portion of the upper longitudinal wall surface portions 143, 143 for supporting the plurality of battery cells toward the upper surface portion 142. Thus, the plurality of battery cells positioned in the upper layer is fastened with the fastening screws between the cells, whereby strong fastening can be achieved.

Similarly, the lower coupling means 150 includes fastening boss portions 151 laterally protruding from the pair of lower longitudinal wall surface portions, which extend upward from both side edges in the widthwise direction of the flat plate-shaped lower surface portion of the lower holding frame member 121 and which are facing each other, and fastening boss portions 152 laterally protruding from the pair of central longitudinal wall surface portions of the middle holding frame member 131. The fastening boss portions 151 and the fastening boss portions 152 are fastened using lower fastening screws 153, whereby the middle holding frame member 131 is securely fastened over the lower holding frame member 121. The fastening boss portions 151 of the lower holding frame member 121 are formed at intermediate positions of the plurality of lower-layer lower recessed surfaces, which are cut out in semicircular-arc shape from the upper side portion of the lower longitudinal wall surface portions 123, 123, supporting the plurality of battery cells, toward the lower surface portion 122. Thus, the plurality of battery cells positioned in the lower layer is fastened with the lower fastening screws 153 between the cells, whereby strong fastening can be achieved.

Thus, the upper coupling means 160 fasten the six fastening boss portions 161 formed on the upper holding frame member 141 and the six fastening boss portions 162 formed on the middle holding frame member 131 to each other using the six fastening screws 163 between the seven battery cells of the upper layer. Thus, even when there are variations in the outer diameter of the seven battery cells in the upper layer, the holding frame members can be fastened in the vicinity of the battery cells, whereby the cells can be uniformly held and secured. The lower coupling means 150 fastens the six fastening boss portions 151 formed on the lower holding frame member 121 and the six fastening boss portions 152 formed on the middle holding frame member 131 using the six fastening screws 153 between the seven battery cells of the lower layer. Thus, even when there are variations in the outer diameter of the seven battery cells of the lower layer, the holding frame members can be fastened in the vicinity of the battery cells, so that the cells can be uniformly held and secured. Accordingly, in the battery cell arranged bodies 103 held between the holding frame members coupled by the upper coupling means 160 and the lower coupling means 150, the battery cells 101 are prevented from being slightly moved by vibration and the like, whereby loading to the welded portions of the conductive members 191 connected to the battery cell electrodes by, e.g., welding can be decreased.

The lower holding frame member 121, the middle holding frame member 131, and the upper holding frame member 141 of the holding case 111 are provided with a positioning means 170 for accurately fitting the lower holding frame member 121 and the middle holding frame member 131 to each other, and the middle holding frame member 131 and the upper holding frame member 141 to each other.

The positioning means 170 includes a convex portion formed on an opposed surface of one of opposed members, and a recess portion formed in an opposed surface of the other member in which the convex portion is fitted. For example, the positioning means is provided at the four corners of the opposed surfaces of the middle holding frame member 131 and the upper holding frame member 141 similarly, the positioning means including convex portions 171 protruding downward from the upper holding frame member 141, and upper opening recess portions 172 formed in the middle holding frame member 131 in which the convex portions 171 are fitted. Four each of the convex portions 171 and the recess portions 172 are formed so that the middle holding frame member 131 and the upper holding frame member 141 can be set in a prescribed positional relationship. Thus, the upper fastening screws 163 of the upper coupling means 160 can be easily screwed.

At the four corners on the opposed surfaces of the lower holding frame member 121 and the middle holding frame member 131, the convex portions 171 are formed protruding downward from the middle holding frame member 131, while the upper opening recess portions 172 in which the convex portions 171 are fitted are formed in the lower holding frame member 121. Four each of the convex portions 171 and the recess portions 172 are formed so that the lower holding frame member 121 and the middle holding frame member 131 can be set in a prescribed positional relationship. Thus, the lower fastening screws 153 of the lower coupling means 170 can be screwed easily. The convex portions and the recess portions may be inversely formed, and by appropriately combining the convex portions and the recess portions, erroneous assembly of the three members 121, 131, and 141 can be prevented.

A method of assembling the holding case 111 having the above configuration will be described with reference to FIGS. 6, 7, and 10. First, the battery cells 101 are inserted from above the lower holding frame member 121, and respectively held on the lower-layer lower holder portions 124. The battery cells 101 are held while being aligned such that the positive electrodes of the battery cells 101 are positioned on one side in the widthwise direction of the holding case 111, whereby the lower-layer battery cell arranged body 103L is configured. When the battery cells 101 are inserted in the lower holding frame member 121, outer peripheral surfaces adjacent to the positive electrodes and negative electrodes are coated with a small width of elastic adhesive, forming an adhesive layer 105 (see FIG. 10).

Then, the middle holding frame member 131 is overlapped on the lower holding frame member 121, the fastening boss portions 151 laterally protruding from the lower longitudinal wall surface portions 123, 123 of the lower holding frame member 121 are overlapped with the fastening boss portions 152 laterally protruding from the pair of central longitudinal wall surface portions 132, 132 of the middle holding frame member 131, and the lower fastening screws 153 are inserted from the lower fastening boss portions 151 and screwed into the upper fastening boss portions 152, whereby the fastening boss portions can be linked. At this time, the lower holding frame member 121 and the middle holding frame member 131 can be easily positioned by fitting the convex portions 171 of the positioning means in the recess portions 172, facilitating the positioning of the fastening boss portions 151, 152 and the insertion of the lower fastening screws 153. By implementing the lower fastening screw 153 screwing operation for six screws for each side, or for 12 screws for both sides, the middle holding frame member 131 can be coupled with the lower holding frame member 121.

Obviously, the direction in which the lower fastening screws 153 are screwed is not limited to from bottom to top but may be from top to bottom. Thus, the lower holding frame member 121 and the middle holding frame member 131 are coupled to each other with the plurality of battery cells 101 held between the lower holding frame member 121 and the middle holding frame member 131. The adhesive layer 105 is formed between the lower holding frame member 121 and the middle holding frame member 131 and the outer peripheral surfaces of the battery cells, so that the battery cells 101 are secured by the adhesive layer as well as via the three point holding.

The battery cells 101 are then inserted from above the middle holding frame member 131 and respectively held on the upper-layer lower holder portions 136 of the middle holding frame member 131. The battery cells 101 are held and aligned such that the positive electrode terminals of the battery cells 101 are positioned on the other side in the widthwise direction of the holding case 111, whereby the upper-layer battery cell arranged body 103U is configured. In this case, too, when the battery cells 101 are inserted in the middle holding frame member 131, the outer peripheral surfaces adjacent to the positive electrodes or negative electrodes are coated with a small width of elastic adhesive, forming the adhesive layer 105 (see FIG. 10).

Thereafter, the upper holding frame member 141 is overlapped on the middle holding frame member 131, the fastening boss portions 161 laterally protruding from the central longitudinal wall surface portions 132, 132 of the middle holding frame member 131 and the fastening boss portions 162 laterally protruding from the pair of upper longitudinal wall surface portions 143, 143 of the upper holding frame member 141 are overlapped, and the upper fastening screws 163 are inserted from the upper fastening boss portions 162 and screwed into the lower fastening boss portions 161, whereby the fastening boss portions are linked.

At this time too, the middle holding frame member 131 and the upper holding frame member 141 can be easily positioned by fitting the convex portions 171 of the positioning means in the recess portions 172, facilitating the positioning of the fastening boss portions 161,162 and the insertion of the upper fastening screws 163. By implementing the upper fastening screw 163 screwing operation for six of the screws for each side, or for 12 of the screws for both sides, the upper holding frame member 141 can be coupled with the middle holding frame member 131.

Obviously, the direction of screwing of the upper fastening screws 163 is not limited to from top to bottom, and may be from bottom to top. Thus, the middle holding frame member 131 and the upper holding frame member 141 are coupled to each other with the plurality of battery cells 101 held between the middle holding frame member 131 and the upper holding frame member 141. The battery cells 101 are secured by the adhesive layer 105 formed between the middle holding frame member 131 and upper holding frame member 141 and the outer peripheral surfaces of the battery cell, as well as by the three point holding.

According to the above method of assembling the holding case 111, the holding case 111 can be assembled from the lower portion toward the upper portion thereof in sequence. Thus, the battery blocks 40 can be assembled easily, and the manufacturing cost can be reduced by a decrease in man-hour.

When the battery blocks 40 are in the state illustrated in FIG. 8 following the assembly of the holding case 111, the conductive members 191 and the voltage detection boards 201, 202 are attached. The conductive members 191 are used for electrically connecting the battery cells 101 held in the holding case 111 in series by, e.g., welding so as to form the assembled battery. As illustrated in FIG. 8, the conductive members 191 are respectively attached along the longitudinal wall surface portions (side surfaces) 114, 114 on both sides of the holding case 111.

One end of the conductive members 191 is electrically connected, through the circular openings formed by the open window portions 125 of the lower holding frame member 121 and the open window portions 135 of the middle holding frame member 131, to the ends of the battery cells 101 of the lower layer. The other end of the conductive members 191 is electrically connected, through the circular openings formed by the open window portions 137 of the middle holding frame member 131 and the open window portions 145 of the upper holding frame member 141, to the ends of the battery cells 101 of the upper layer which are positioned diagonally above from the longitudinal direction of the battery cells 101 of the lower layer. The upper and lower battery cells 101 are connected in series. At substantially the center position of the conductive members 191, connection terminals 192 for electrical connection with the voltage detection terminals 204 on the voltage detection boards 201, 202 are provided.

The positive electrode terminal 40A of the battery blocks 40 is connected to the electrode of the battery cell 101, of the upper-layer battery cell arranged body 103U, disposed at a position protruding beyond the lower-layer battery cell arranged body 103L in the longitudinal direction. The negative electrode terminal 40B of the battery blocks 40 is connected to the electrode of the battery cell 101, of the lower-layer battery cell arranged body 103L, disposed at a position protruding beyond the upper-layer battery cell arranged body 103U in the longitudinal direction. Namely, the positive electrode terminal 40A functions as a lead electrode for one positive electrode of the 14 battery cells connected in series, and the negative electrode terminal 40B functions as a lead electrode for one negative electrode of the 14 battery cells.

After the conductive members 191 are attached, the voltage detection boards 201, 202 are respectively attached along the longitudinal wall surface portions 114, 114 on both sides of the holding case 111 while laterally overlapping the conductive members 191. In the present embodiment, the voltage detection boards 201, 202 are fastened to the holding case 111 with a plurality of fastening screws 193.

While the voltage detection boards 201, 202 may be fitted with other elements, connectors, connection terminals and the like which are not illustrated, description of these will be omitted. In the present embodiment, the two voltage detection boards have different outer shapes. However, the two voltage detection boards may have the same outer shape and wiring pattern so that they can be mutually replaced, whereby their assembly and construction can be easily performed.

<Voltage Detection Board>

In the following, an embodiment of voltage detection of the battery cells of the battery block using the voltage detection boards will be described with reference to the drawings.

Referring initially to FIG. 14 to FIG. 18, an overall configuration of the battery block using the voltage detection boards will be described.

FIG. 14 is a perspective view of the battery block to which the voltage detection boards are attached. FIG. 15 is a perspective view of the back surface of the voltage detection board.

The voltage detection boards 201, 202 include a voltage detection circuit that detects the voltage of the battery cells 101. The voltage detection boards 201, 202 have a band plate shape extending with a substantially constant width along the longitudinal wall surface portions 114 of the holding case 111. On the back surface opposite the holding case 111, a connector 206 for connecting a voltage detection line (not shown), and fuses 205 for disconnecting the circuit when the battery cells are short-circuited are provided. The fuses 205 are blown in case of short-circuit to prevent a large current flow through the control unit, thus preventing smoking or firing from the connector 206 or the voltage detection line.

The voltage detection boards 201, 202 are provided with the voltage detection terminals 204. The voltage detection terminals 204 are electrically connected to the connection terminals 192 of the conductive members 191, and are disposed at locations opposite the connection terminals 192 of the conductive members 191 with the voltage detection boards 201, 202 attached to the holding case 111. The voltage detection terminals 204 are disposed on the back surface side of the voltage detection boards 201, 202 at predetermined intervals in the longitudinal direction of the voltage detection boards 201, 202.

The voltage detection terminals 204 are respectively disposed opposite substantially the center position of the conductive members 191 so that the terminals can be connected to the conductive members 191 when the voltage detection boards 201, 202 are flipped in the longitudinal direction and then attached with one and the other sides of the boards in the longitudinal direction reversed.

For example, in the power supply device described in Patent Literature 1, the only method described for securing the circuit board is that by which the circuit board is attached in an upper-lower surface direction of the battery core. When the battery cells are stacked in the height direction in a plurality of stages, the battery cells on the circuit board side and the battery cells which are the most spaced apart from the substrate may be influenced by the resistance of the battery lead plate, whereby abnormality values may be measured.

In contrast, in the battery blocks 40 according to the present embodiment, the voltage detection boards 201, 202 are disposed on the side surfaces of the holding case 111, and the voltage detection terminals 204 on the voltage detection boards 201, 202 are connected to the connection terminals 192 disposed at substantially the center position of the respective conductive members 191. Thus, the voltages of both the upper-stage battery cells 101 and the lower-stage battery cells 101 can be accurately detected.

The voltage detection boards 201, 202 are provided with opening portions 203 opened at positions respectively opposite the voltage detection terminals 204. The voltage detection terminals 204 are connected to the conductive members 191 by inserting terminal screws 194 through the opening portions 203 and threadedly engaging the screws with the screw holes of the connection terminals 192 of the conductive members 191, thus fastening the screws to the connection terminals 192.

Figure 16:
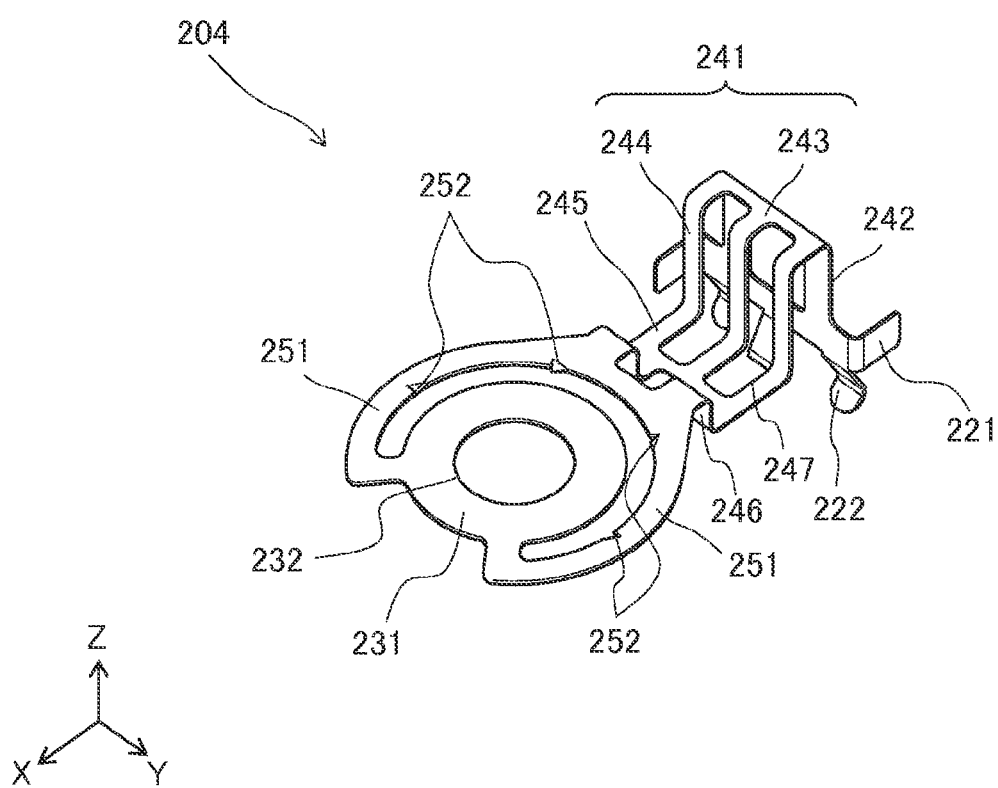
FIG. 16 is a perspective view of a voltage detection terminal.
Figure 17:
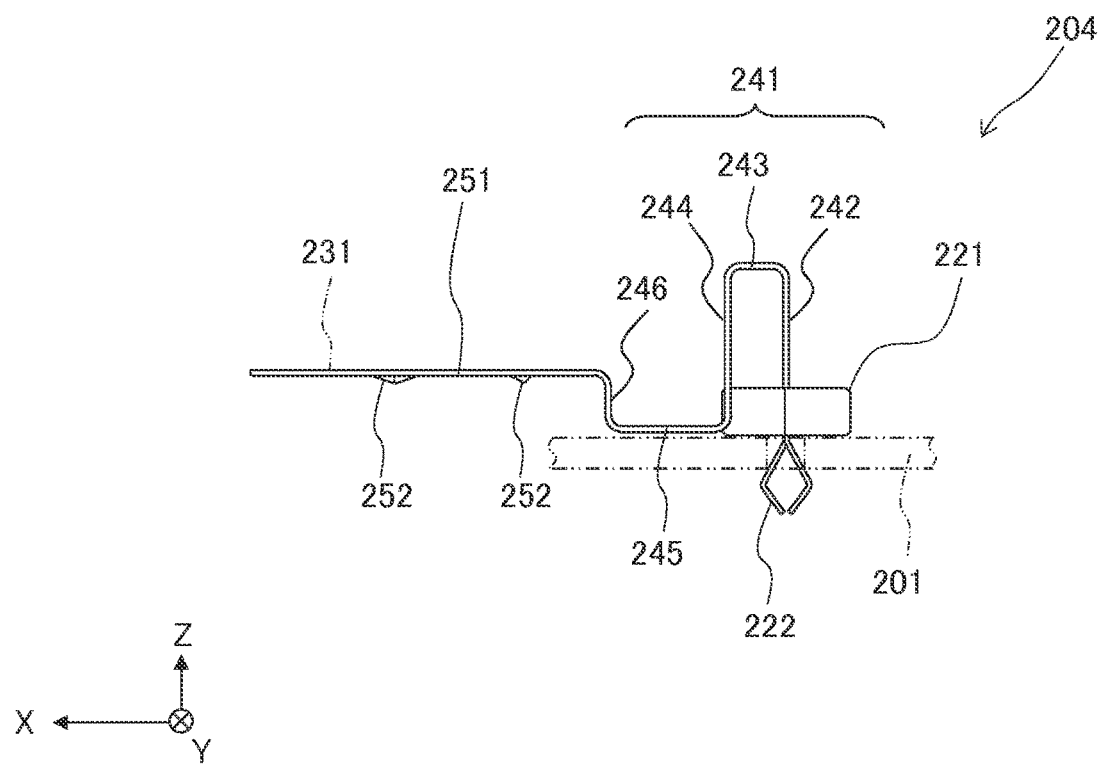
FIG. 17 is a sagittal view in a lateral width direction of the voltage detection terminal.

FIG. 16 is a perspective view of the voltage detection terminal. FIG. 17 is a lateral width direction sagittal view of the voltage detection terminal. For convenience's sake, the X-direction in FIG. 16 and FIG. 17 will be referred to as a forward direction, the Y-direction as a lateral width direction, and the Z-direction as a height direction. However, these directions do not limit the state of attached posture.

The voltage detection terminals 204 are formed by bending an electrically conductive metal plate, and include a securing portion 221 secured to the voltage detection boards 201, 202; a connection portion 231 connected to the connection terminals 192 of the conductive members 191; a bend portion 241 capable of elastically supporting the connection portion 231 with respect to the securing portion 221, and support arm portions 251. The voltage detection terminals 204 are fitted to the voltage detection boards 201, 202 in such a manner that the securing portion 221 and the connection portion 231 are disposed along the direction in which the conductive members 191 are arranged.

The securing portion 221 has a substantially crank-like shape as viewed in plan, rising vertically with a predetermined lateral width, with both ends in the lateral width direction being bent at right angles in mutually opposite directions, such that the securing portion 221 can be prevented from falling and can instead maintain a standing posture state when attached to the voltage detection boards 201, 202. At the lower end of the securing portion 221, three leads 222 are disposed protruding at predetermined intervals in the lateral width direction. Of the three leads 222, the center lead is bent in substantially V-shape protruding forward, while the leads on the sides are bent in substantially V-shape protruding rearward.

The voltage detection terminals 204 are secured to the voltage detection boards 201, 202 by inserting the three leads 222 of the securing portion 221 into through-holes 201a formed in the voltage detection boards 201, 202 in advance. By soldering the three leads 222 to the voltage detection boards 201, 202, the voltage detection terminals 204 are connected to the voltage detection circuit. While in the present embodiment the leads 222 have a shape adapted to flow soldering, the shape may be modified to adapt to reflow soldering.

The connection portion 231 is elastically supported on the securing portion 221 via the bend portion 241 and the support arm portions 251, and disposed forwardly of the securing portion 221. The connection portion 231 is formed in such a manner as to be disposed in parallel and along the voltage detection boards 201, 202 with the voltage detection terminals 204 attached to the voltage detection boards 201, 202. The connection portion 231 has a disc shape extending along a plane (X-Y plane) including the front-rear direction and the lateral width direction, with a mount hole 232 provided at the center for insertion of the threaded portion of the terminal screws 194. The connection portion 231 has substantially the same size as the outer diameter of a screw head portion 194a of the terminal screws 194. The connection portion 231 is pressed onto the connection terminals 192 as the threaded portion of the terminal screws 194 is inserted into the mount hole 232 and threadedly engaged with the screw hole of the connection terminals 192 of the conductive members 191.

The bend portion 241 is formed such that it can reciprocate up and down by moving forward from the securing portion 221, and has a bent shape with substantially U-shaped cross section including a rising portion rising from the securing portion 221, and a falling portion opposite the rising portion. In the present embodiment, the bend portion 241 includes a first rising portion 242 continuously rising from the securing portion 221; a head-top portion 243 bent forward at the upper end of the first rising portion 242; a falling portion 244 bent downward at the front end of the head-top portion 243 and opposed to the first rising portion 242; a bottom surface portion 245 bent forward again from the falling portion 244 at substantially the same height position as the lower end of the securing portion 221; and a second rising portion 246 bent upward at the front end of the bottom surface portion 245.

The height position of the first rising portion 242 is set at substantially the same height as the fuses 205. The height position of the second rising portion 246 is set lower than the first rising portion 242. The bend portion 241 is provided with lightening holes 247 which are continuous across the head-top portion 243, the falling portion 244, and the bottom surface portion 245. The bend portion 241 can be elastically deformed to movably support the connection portion 231 with respect to the securing portion 221 mainly in the front-rear direction (X-direction). The bend portion 241 can also movably support the connection portion 231 in directions along the plane (X-Y plane) including the front-rear direction and the lateral width direction and in the upper-lower direction (Z-direction). The bend portion 241 is configured to be elastically deformable between the securing portion 221 and the connection portion 231 in the arranged direction of the conductive members 191.

The support arm portions 251 are bent forward at the upper end of the second rising portion 246, and have a flat plate shape branched into two prongs and extending along the outer periphery of the connection portion 231 in arc with a constant width. The support arm portions 251 extend from the bend portion 241 to a position further forward than the connection portion 231, with each front end portion linked with a front portion of the connection portion 231.

The support arm portions 251 can be elastically deformed so as to movably support the connection portion 231 in the upper-lower direction (Z-direction). Namely, the support arm portions 251 are configured to be elastically deformable in a direction toward or away from the voltage detection boards 201, 202. In the present embodiment, the support arm portions 251 extend from the bend portion 241 rearward of the connection portion 231 to the position further forward than the connection portion 231, with each front end portion linked with the front portion of the connection portion 231. Thus, a long length can be ensured for the support arm portions 251 in the front-rear direction (X-direction), whereby a greater amount of deformation in the upper-lower direction (Z-direction) can be ensured.

In the support arm portions 251, lancing portions 252 are formed by partially cutting and bending the arm portions. The lancing portions 252 suppress relative rotation of the connection portion 231 caused by the terminal screws 194 when the voltage detection terminals 204 are fastened to the connection terminals 192 of the conductive members 191, thereby preventing deformation of the voltage detection terminals 204 by the fastening torque. The lancing portions 252 protrude toward the opening portions 203 of the voltage detection boards 201, 202. In the present embodiment, a plurality of the lancing portions 252 is provided at predetermined intervals along the inner peripheral edge of the support arm portions 251. The plurality of the lancing portions 252 may be provided on the outer peripheral edge together with the inner peripheral edge or instead of the inner peripheral edge.

According to the voltage detection terminals 204 having the above configuration, stress due to mounting variations or thermal expansion/contraction of the various components can be reduced because of the elastically deformable bend portion 241 and the support arm portions 251.

Particularly, the voltage detection terminals 204, as illustrated in FIG. 15, are disposed such that their front-rear direction is along the longitudinal direction of the voltage detection boards 201, 202. Namely, the voltage detection terminals 204 are disposed such that the securing portion 221 and the connection portion 231 are arranged along the longitudinal direction of the voltage detection boards 201, 202.

The holding case 111 and the voltage detection boards 201, 202 have different ratios of thermal expansion. Thus, when thermal expansion or contraction is caused by a change in temperature environment, size change increases, particularly in the longitudinal direction. According to the present embodiment, the voltage detection terminals 204 are disposed along the longitudinal direction of the voltage detection boards 201, 202. Accordingly, the difference in size change can be effectively absorbed by elastic deformation of the bend portion 241, whereby the stress acting on the conductive members 191 can be reduced.

Furthermore, the mounting variations of the various components can be effectively absorbed by elastic deformation of the bend portion 241 and the support arm portions 251, whereby the stress acting on the conductive members 191 can be reduced.

Thus, peeling of the welded portions of the battery cells 101 and the conductive members 191, or cracking in the conductive members 191 can be prevented, whereby the state of voltage detection from the conductive members connecting the battery cells can be stabilized.

Figure 18:
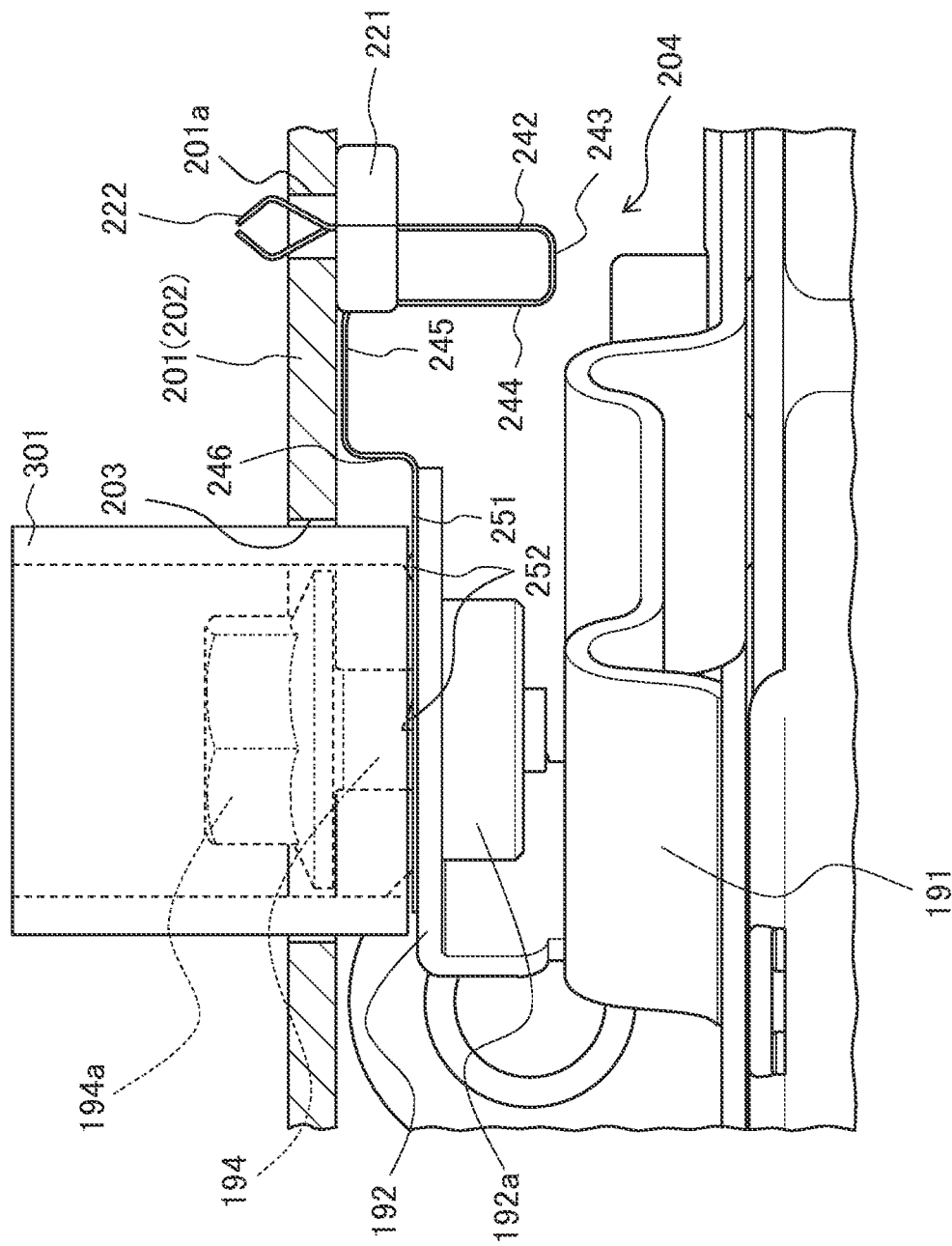
FIG. 18 is a cross sectional view for describing a method of connecting the voltage detection terminal and a conductive member connection terminal.

FIG. 18 is a cross sectional view for describing a method of connecting the voltage detection terminal and a conductive member connection terminal.

The conductive members 191 have both end portions thereof welded to the respective electrodes of the upper and lower battery cells 101 held in the holding case 111, with the connection terminals 192 provided at the center. The connection terminals 192 have a rectangular flat plate shape opposed to the center position of the conductive members 191 (see FIG. 5, for example). At the center of the connection terminals 192, a through-hole for insertion of the terminal screws 194 is provided. On the inner face of the connection terminals 192, a press nut 192a is provided at a position providing communication with the through-hole.

In order to connect the voltage detection terminals 204 and the conductive members 191, initially, the voltage detection boards 201, 202 are located at pre-set mount positions along the longitudinal wall surface portions 114 of the holding case 111. Thus, the connection portion 231 is opposed to the connection terminals 192 of the conductive members 191, with the mount hole 232 of the connection portion 231 disposed at the position providing communication with the through-hole of the connection terminals 192.

Then, the terminal screws 194 are inserted into the opening portions 203 of the voltage detection boards 201, 202, and the threaded portion of the terminal screws 194 is inserted into the mount hole 232 of the connection portion 231 of the voltage detection terminals 204 and screwed into the press nut 192a. Thus, the connection portion 231 of the voltage detection terminals 204 is pressed in a surface-contact state onto the connection terminals 192 of the conductive members 191, whereby the voltage detection terminals 204 and the conductive members 191 are connected.

The fastening of the terminal screws 194 is performed using a screw fastening machine, which is not illustrated. The screw fastening machine includes a screw fastening height sensing jig 301 for sensing the screw fastening height. The screw fastening height sensing jig 301 has a substantially cylindrical shape of a predetermined thickness with an outer diameter enabling insertion into the opening portions 203 of the voltage detection boards 201, 202, and an inner diameter allowing insertion of the screw head portion 194*a* of the terminal screws 194. When screwing, the front end portion of the jig is inserted into the opening portions 203 of the voltage detection boards 201, 202 and abutted on the support arm portions 251 of the voltage detection terminals 204, whereby the support arm portions 251 are pressed onto the connection terminals 192 of the conductive members 191.

When the terminal screws 194 are rotated by the screw fastening machine for fastening, rotation torque is generated in the connection portion 231 of the voltage detection terminals 204 due to friction with the screw head portion 194*a* of the terminal screws 194. In the present embodiment, the support arm portions 251 of the voltage detection terminals 204 are provided with the plurality of lancing portions 252 protruding toward the opposite voltage detection boards 201, 202. Thus, the front end portion of the screw fastening height sensing jig 301 and the lancing portions 252 are engaged with each other so that rotation of the connection portion 231 in the screw fastening direction by the fastening torque can be suppressed, thus preventing deformation of the voltage detection terminals 204. The surface of the front end portion of the screw fastening height sensing jig 301 has satin finish, for example, so that the lancing portions 252 can be readily engaged.

According to the present embodiment, deformation of the voltage detection terminals 204 by fastening torque can be prevented. Thus, an automatic screw fastening machine can be introduced to perform the terminal screw 194 fastening operation, achieving a cost decrease by saving labor force.

<Battery Block Securing Structure>

The battery blocks 40 holding the plurality of battery cells 101 configured as described above, in assembled state, have the exterior view of the holding case 111 with longitudinal hexahedral shape, presenting a substantially cuboidal shape. At the four corners of the battery blocks 40, securing means 180 for securing the battery blocks in the lower case 11 of the module housing 2 are formed. In the following, the securing means will be described with reference to FIG. 4, FIG. 13 and the like.

Referring to FIG. 4 and FIG. 13, the securing means 180 include a cylindrical securing boss portion with a through-hole extending in the upper-lower direction; a stud bolt vertically secured on a housing bottom wall portion 23 of the lower case 11 of the module housing 2; and a securing nut. Specifically, the securing means 180 include securing boss portions 181 formed at the four corners of the lower holding frame member 121 and having through-holes extending in the upper-lower direction; securing boss portions 182 formed at the four corners of the middle holding frame member 131 and having through-holes in the upper-lower direction; securing boss portions 183 formed at the four corners of the upper holding frame member 141 and having through-holes in the upper-lower direction; stud bolts 184 passed through the through-holes of the three securing boss portions 181, 182, and 183 and disposed upright on the lower case 11; and retaining nuts 185 screwed at the upper end of the stud bolts. The stud bolts are secured to the bottom surface of the lower case by, e.g., welding. The securing boss portions formed on the three, i.e., the upper, middle, and lower holding frame members, are configured such that their respective opposed surfaces contact each other. Each of the battery blocks is provided with four stud bolts 184, for a total of 12 upright stud bolts.

The through-holes of the securing boss portions 181, 182, and 183 formed at the four corners of the battery blocks 40 are passed in order through the stud bolts 184 disposed upright on the lower case 11 of the module housing 2, and the upper ends of the bolts are fastened with the retaining nuts 185, whereby the battery blocks 40 can be reliably secured in the module housing 2. Thus, by similarly passing the stud bolts 184 through the through-holes in the securing boss portions and fastening the bolts with the nuts, the first battery block 41, the second battery block 42, and the third battery block 43 can be easily and reliably secured in the battery unit housing area 2A in the lower case 11.

<Module Housing>

FIG. 13(*a*) is a perspective view of the lower case 11 of the module housing 2. As described above, the module housing 2 includes the lower case 11 with the upper opening, and the upper lid 12 closing the upper opening of the lower case 11 (see FIG. 2). The lower case 11 is formed by box-bending process, and includes the housing bottom wall portion 23 which is substantially rectangular as viewed in plan; the housing front wall portion 21 and the housing rear wall portion 31 facing each other in the front-rear direction; and the pair of housing side wall portions 33 facing each other in the left-right direction, the front, rear, and side wall portions bent at the four sides of the housing bottom wall portion 23 and vertically rising. The housing front wall portion 21, the housing rear wall portion 31, and the housing side wall portions 33 are hermetically joined by welding. Thus, in the lower case 11, the outer peripheries of the housing bottom wall portion 23 are raised upward, forming an internal housing space. The upper portions of the rising portions are extended in horizontal direction, forming flange portions 36. In the flange portions 36, screw holes 37 for securing the upper lid 12 are formed.

Meanwhile, the upper lid 12, as illustrated in FIG. 1 and FIG. 2, is formed of a substantially oblong metal plate material, similarly to the lower case 11, with the outer periphery portions formed with stepped portions 401 opposite the flange portions 36 of the lower case 11, with through-holes 402 formed at positions corresponding to the screw holes 37 of the lower case 11. In a center flat plate portion of the upper lid 12, three stepped portions 403 are formed in a direction perpendicular to the longitudinal direction, with through-holes 404 formed for passing retaining screws.

In the lower case 11, four ribs 411 to 414 are disposed at predetermined intervals in the lateral direction and extending in the front-rear direction. The ribs 411 to 414 are disposed upright on the housing bottom wall portion 23, which extends in planar manner across the housing front wall portion 21 and the housing rear wall portion 31 of the lower case 11. Of the four ribs 411 to 414, the first rib 411 partitions the inside of the lower case 11 into one lateral side and the other lateral side, forming a battery unit housing area 2A housing the battery unit 3, and the control unit housing area 2B housing the control unit 4 (central wall rib).

The lower case 11 is shaped by box-bending processing with the housing front wall portion 21, the housing rear wall portion 31, and the housing side wall portions 33 vertically raised with respect to the housing bottom wall portion 23. Thus, compared with an example in which metal plate material is deep-drawing processed, whereby the wall portions are formed diagonally, there is no waste of space so that the limited space inside a vehicle can be effectively utilized. Accordingly, when installed in the same installation space, a larger internal space can be ensured for the housing. The four ribs 411 to 414 disposed in the lower case 11 are provided with a plurality of holes by lightening process for reducing weight. The lower portion of the lower case 11 is provided with a plurality of brackets 38 for secure installation on the vehicle floor.

The second rib 412 and the third rib 413 partition the battery unit housing area 2A into three battery block housing compartments. Between the first rib 411 and the second rib 412, there is formed a first housing compartment 421 capable of housing the first battery block 41. Between the second rib 412 and the third rib 413, there is formed a second housing compartment 422 capable of housing the second battery block 42. The fourth rib 414 is disposed along the housing side wall portion 33.

The upper portions of the ribs 411 to 414 are provided with screw holes. The three ribs 411 to 413 are disposed in correspondence with the positions of the stepped portions 401 formed on the upper lid 12, with the through-holes 402 of the stepped portions aligned with the screw holes of the three ribs 411 to 413. Thus, the upper lid 12 is configured to close the upper opening of the lower case 11 with the stepped portions 401 of the outer periphery of the lid contacted with the flange portions 36 of the lower case 11 and screwed, and with the three ribs contacted with the stepped portions 401 of the upper lid, the stepped portions 401 being fastened to the upper portions of the ribs 411 to 413 with the screws.

The housing bottom wall portion 23 of the lower case 11, as illustrated in FIG. 13(a), is provided with a plurality of shallow groove portions 24. The shallow groove portions 24 are formed, for example, by causing the housing bottom wall portion 23 to protrude downward when press-forming the lower case 11. The shallow groove portions 24 are disposed extending in the front-rear direction and the lateral direction in a mutually intersecting manner. The shallow groove portions 24 extending in the lateral direction are continuous from the first housing compartment 421 to the third housing compartment 423. Thus, high rigidity can be obtained for the lower case 11, whereby deformation of the module housing 2 can be prevented.

The housing side wall portion 33 of the lower case 11 is formed with a gas discharge opening to which a gas exhaust pipe 35 is connected. Further, the intake openings 22 of the housing front wall portion 21 and the exhaust openings 32 of the housing rear wall portion 31 are formed in pairs at positions corresponding to the housing compartments 421 to 423. The battery blocks 41 to 43 are housed with their lateral movement suppressed by the ribs 411 to 414.

The shallow groove portions 24 formed in the housing bottom wall portion 23 of the lower case 11 allow passage of gas emitted from at least one of the battery cells 101 of the battery blocks 41 to 43 housed in the housing compartments 421 to 423. The gas is thereafter discharged outside the module housing 2 via the gas exhaust pipe 35 connected to the gas discharge opening.

In the above configuration, the shallow groove portions 24 of the lower case 11 are formed continuously between the first housing compartment 421 and the third housing compartment 423, whereby the three housing compartments are placed in communication with each other. Thus, if gas is emitted from at least one of the battery cells 101 of the battery blocks 41 to 43 housed in the housing compartments 421 to 423, the gas can be circulated, via the shallow groove portions 24, to the housing side wall portions 33 to which the gas exhaust pipe 35 is connected, and then discharged out of the module housing 2 via the gas exhaust pipe 35. Accordingly, the gas emitted within the module housing 2 can be prevented from remaining in the module housing 2 and entering the holding case 111 of the battery blocks 40 via the gap between the housing front wall portion 21 and the case front end surface portion 115, for example, or from passing the gap between the housing rear wall portion 31 and the case rear end surface portion 115 and being discharged via the exhaust openings 32 of the housing rear wall portion 31.

Further, in the housing bottom wall portion 23 of the lower case 11, the shallow groove portions 24 are formed extending in the front-rear direction and the lateral direction. In addition, the first rib 411 to the fourth rib 414 are provided extending in the front-rear direction. Thus, a high rigidity can be obtained for the lower case 11, whereby deformation of the module housing 2 can be prevented.

The three battery blocks 41 to 43 with the above configuration are housed in the battery unit housing area 2A of the module housing 2 and secured in the housing 2 by the securing means 180. Specifically, into the through-holes of the securing boss portions 181, 182, and 183 formed at the four corners of the upper, middle, and lower holding frame members 121, 131, and 141 of the battery blocks 40, the stud bolts 184 disposed upright on the housing bottom wall portion 23 of the lower case 11 are inserted, whereby the three battery blocks are positioned and housed in the lower case 11.

In the three battery blocks 41 to 43 housed and secured in the lower case 11, three of the positive electrode terminals 40A (41A, 42A, 43A) and three of the negative electrode terminals 40B (41B, 42B), 40C (43C) are positioned in the front-rear direction as external lead terminals. Thus, the harness or busbar connecting the three positive electrode terminals 40A is disposed within a harness guide 54A disposed in the module housing 2, and the harness or busbar connecting the three negative electrode terminals 40B, 40C is disposed within a harness guide 54B disposed in the module housing 2.

The harness guide 54A on the front side in the front-rear direction connects the positive electrode terminals 40A of the three battery blocks, for example, and delivers wiring to the control unit area 2B. The harness guide 54B on the rear side connects the negative electrode terminals 40B, 40C of the three battery blocks, for example, and delivers wiring to the control unit area 2B. The power supply lines of the power supply unit 3 are connected to predetermined terminals of the control unit 4 in the control unit area 2B. In the present embodiment, when the retaining nuts 185 are fastened, the upper lid 12 is placed, the stepped portions 401 of the upper lid 12 and the ribs 411 to 413 are overlapped, and the retaining nuts are similarly fastened, whereby the module housing 2 and the plurality of batteries blocks can be strongly coupled with each other.

While embodiments of the present invention have been described, the present invention is not limited to the above embodiments, and various design modifications may be made without departing from the spirit of the present invention as set forth in the claims. The embodiments have been described to facilitate an understanding of the present invention, and are not limited to have all of the described configurations. A part of the configuration of one embodiment may be replaced with the configuration of another embodiment, or the configuration of the other embodiment may be incorporated into the configuration of the one embodiment. Furthermore, with respect to a part of the configuration of each embodiment, addition of another configuration, deletion, or substitution may be made.

For example, while in the foregoing embodiments the battery blocks 40 have the two layers of the upper-layer battery cell arranged body 103U and the lower-layer battery cell arranged body 103L, the number of the layers may be three or more.

Alternatively, one layer of battery cell arranged body may be sandwiched between upper and lower holder members. Furthermore, the secondary battery module according to the present invention is not limited for the purpose of vehicles such as automobiles, and may also be applied for railroad vehicle purposes.

REFERENCE SIGNS LIST

1 Lithium ion battery device (secondary battery module, electricity storage device)
2 Module housing (housing)
11 Lower case
12 Upper lid
3 Battery unit
4 Control unit
40 Battery block
40A Positive electrode terminal (external lead terminal)
40B Negative electrode terminal (external lead terminal)
40C Negative electrode terminal (external lead terminal)
101 Battery cell
102 Dummy cell
105 Adhesive layer
111 Holding case
121 Lower holding frame member (lower-layer holder member)
126, 146 Pressing portion
131 Middle holding frame member (intermediate holder member)
138, 139 Protrusion portion
141 Upper holding frame member (upper-layer holder member)
150,160 Fastening means
170 Positioning means
171 Convex portion (positioning convex portion)
172 Recess portion (positioning recess portion)
180 Securing means
184 Stud bolt
191 Conductive members
201, 202 Voltage detection board
203 Opening portion
204 Voltage detection terminal
221 Securing portion
231 Connection portion
241 Bend portion
251 Support arm portion
252 Lancing portion

The invention claimed is:

1. A battery block comprising:
a holding case holding a plurality of battery cells;
a plurality of conductive members arranged along a side surface of the holding case and electrically connecting corresponding battery cells;
a voltage detection board disposed opposite the side surface of the holding case to detect a voltage of the battery cells; and
a plurality of voltage detection terminals disposed on the voltage detection board and respectively electrically connected to the plurality of conductive members,
wherein:
in each of the voltage detection terminals, a securing portion secured to the voltage detection board and a connection portion connected to the conductive members are disposed along an arranged direction, with a bend portion which is elastically deformable at least in the arranged direction disposed between the securing portion and the connection portion;
the bend portion includes a rising portion rising from the securing portion and a falling portion opposite the rising portion, and has a bent shape with U-shaped cross section; and
each of the voltage detection terminals includes a support arm portion disposed between the bend portion and the connection portion and elastically deformable at least in a direction toward or away from the voltage detection board.

2. The battery block according to claim 1, wherein:
the connection portion has the shape of a disc disposed along and in parallel with the voltage detection board and fastened to the conductive members with a screw; and
the support arm portion has the shape of a flat plate disposed on the same plane as the connection portion and branched into two prongs extending along an outer periphery of the connection portion in arc shape.

3. The battery block according to claim 2, wherein the support arm portion extends from the bend portion along the arranged direction and beyond the connection portion, with a front end portion linked with the connection portion.

4. The battery block according to claim 3, wherein:
the voltage detection board includes an opening portion opened at a position opposite the connection portion and the support arm portion; and
the support arm portion includes a lancing portion cut and bent from a part of the support arm portion toward the opening portion.

5. The battery block according to claim 2, wherein:
the voltage detection board includes an opening portion opened at a position opposite the connection portion and the support arm portion; and
the support arm portion includes a lancing portion cut and bent from a part of the support arm portion toward the opening portion.

6. A battery module comprising the battery block according to claim 1.

7. A battery module comprising the battery block according to claim 4.

* * * * *